May 5, 1931. T. A. FEDERWITZ ET AL 1,803,935
CONVEYING SYSTEM
Filed July 1, 1925   18 Sheets-Sheet 8
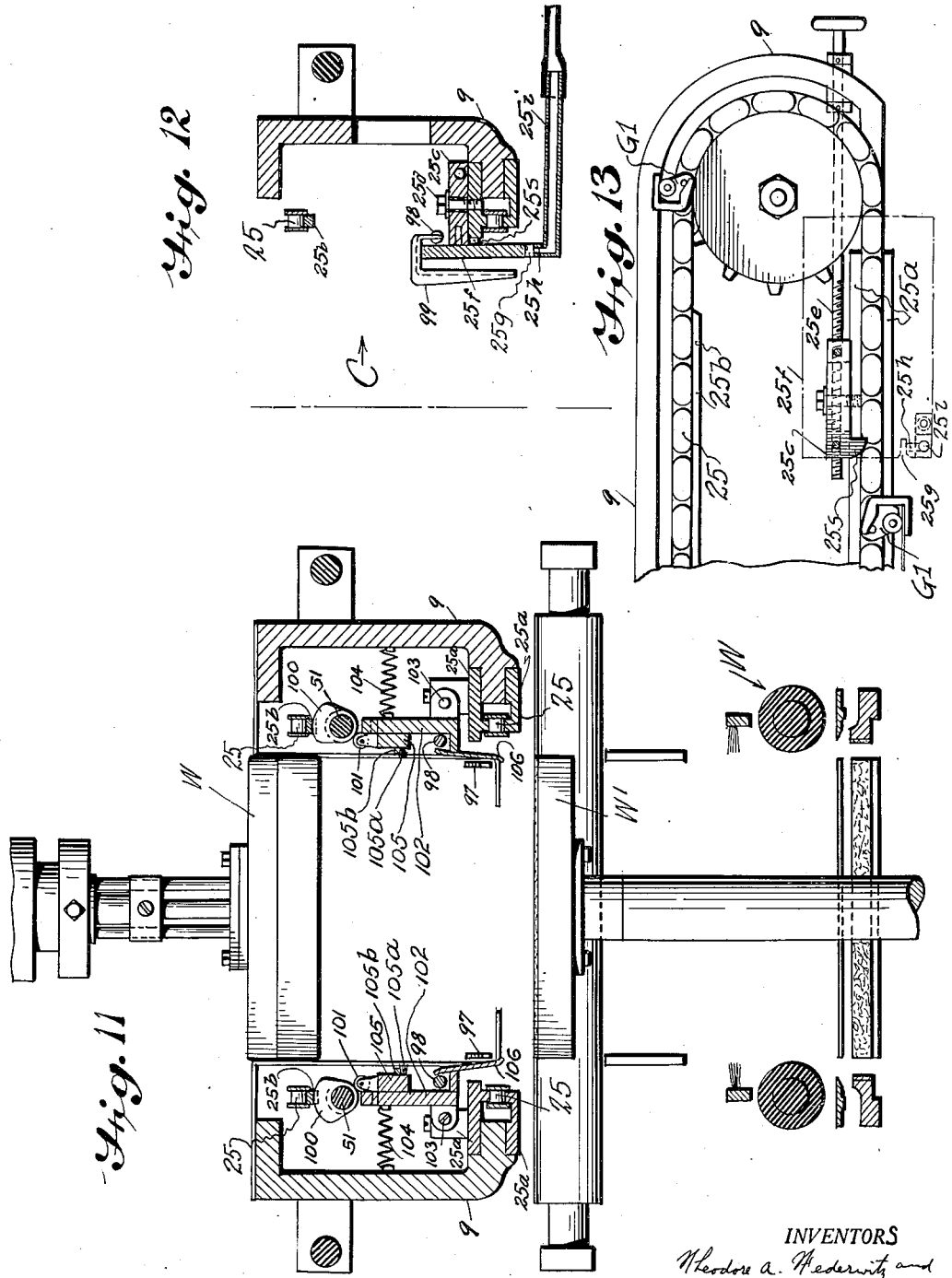
INVENTORS
Theodore A. Federwitz and
Walter V. Bailey
BY Cornelius L. Elret
their ATTORNEY.

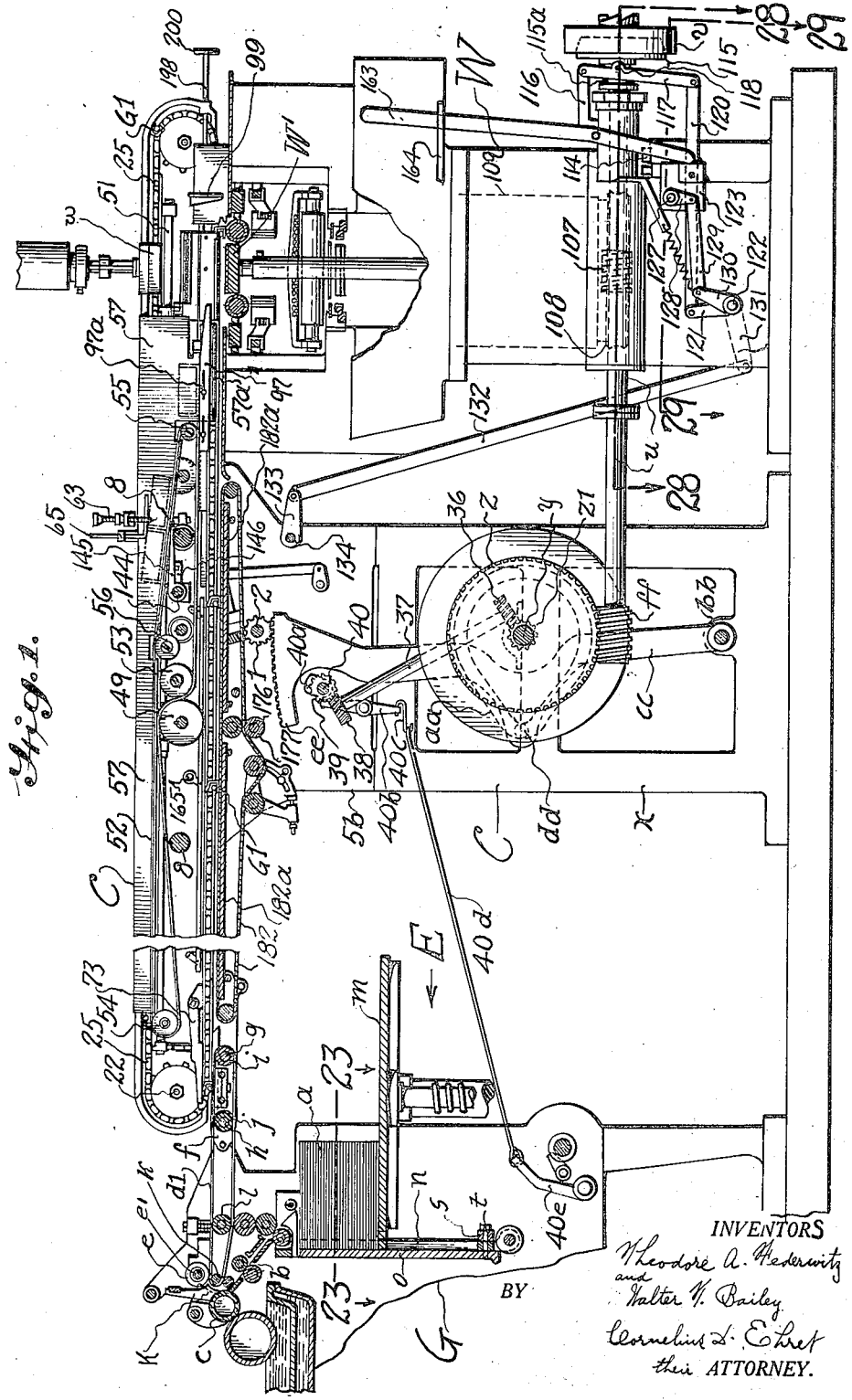

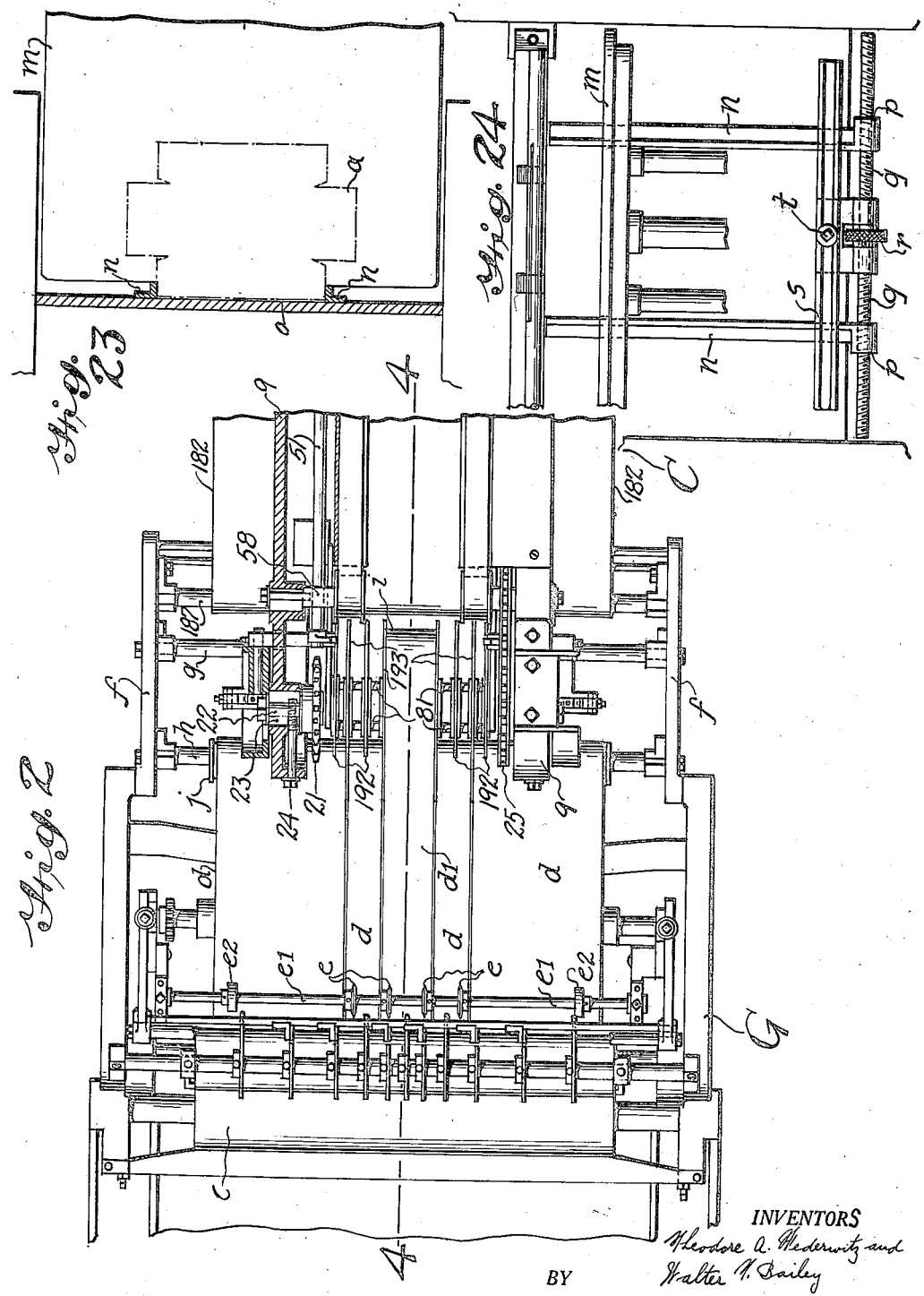

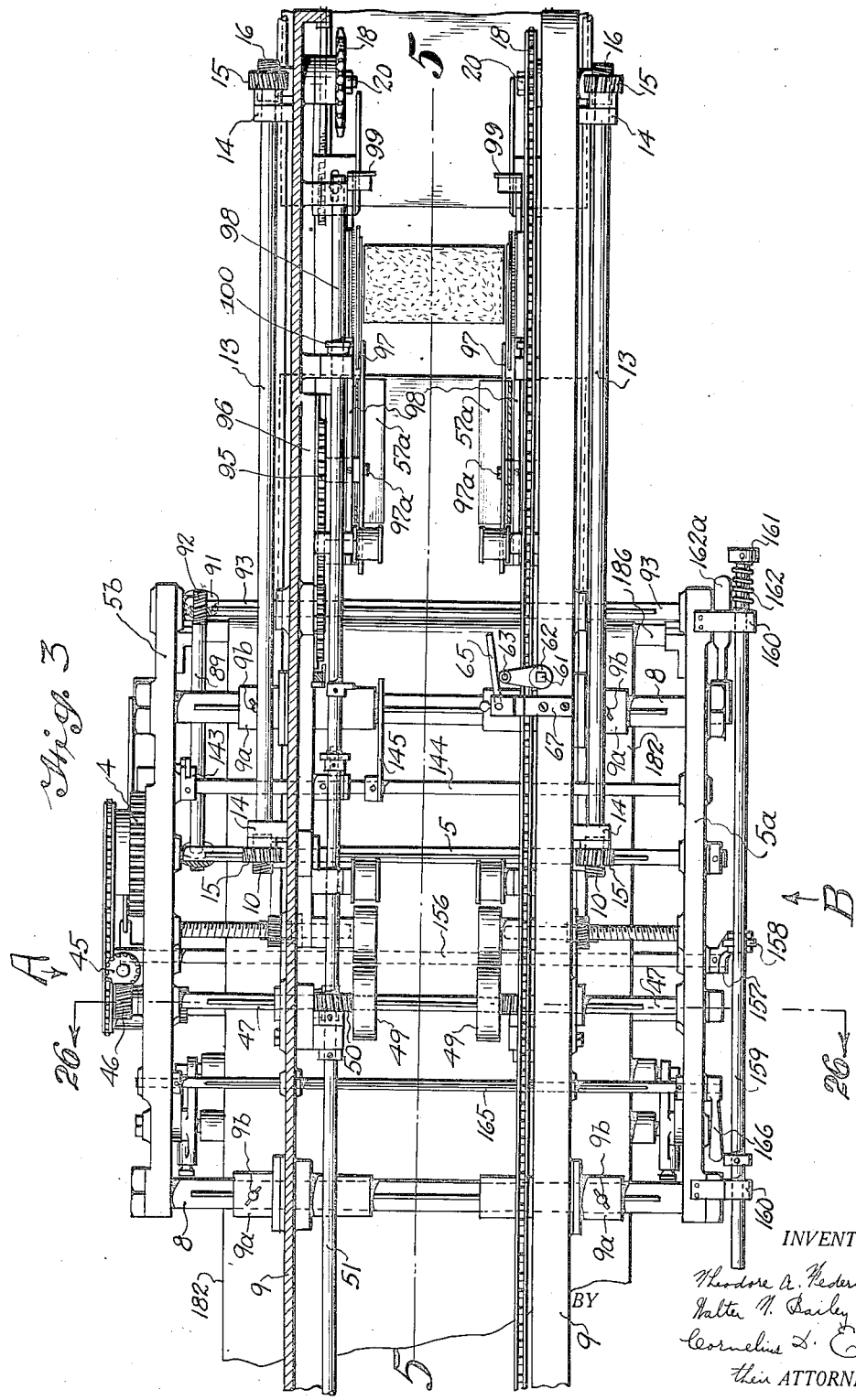

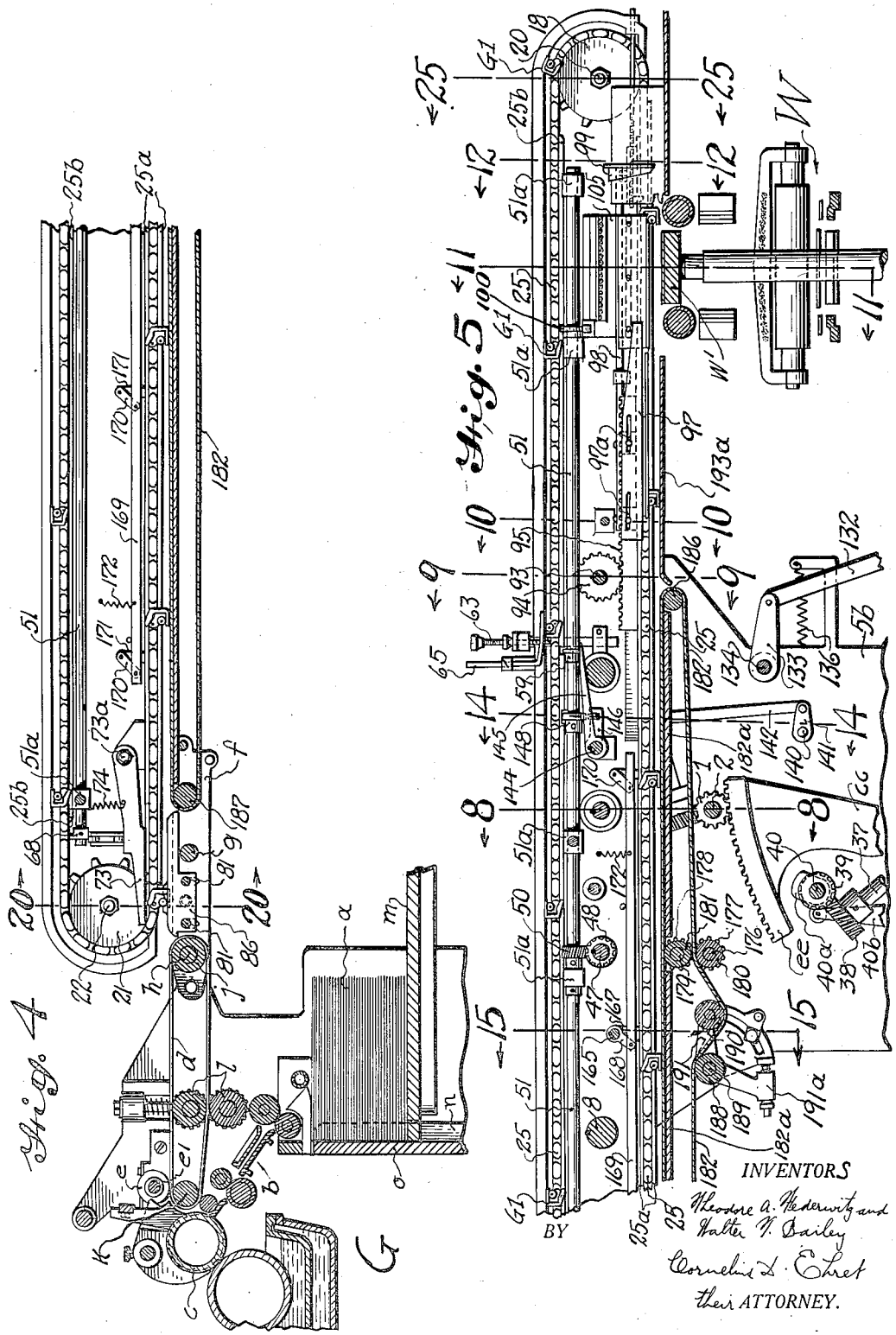

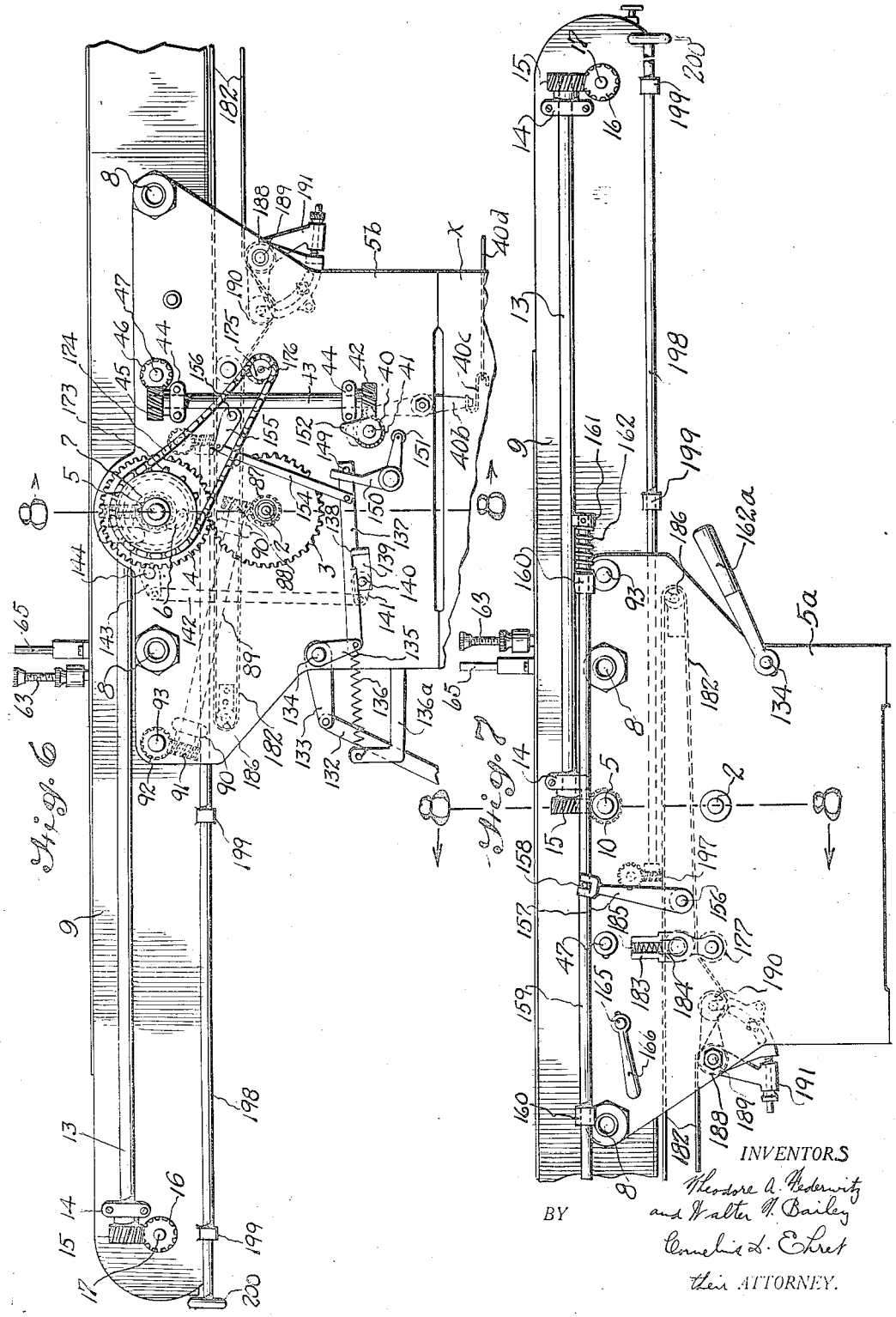

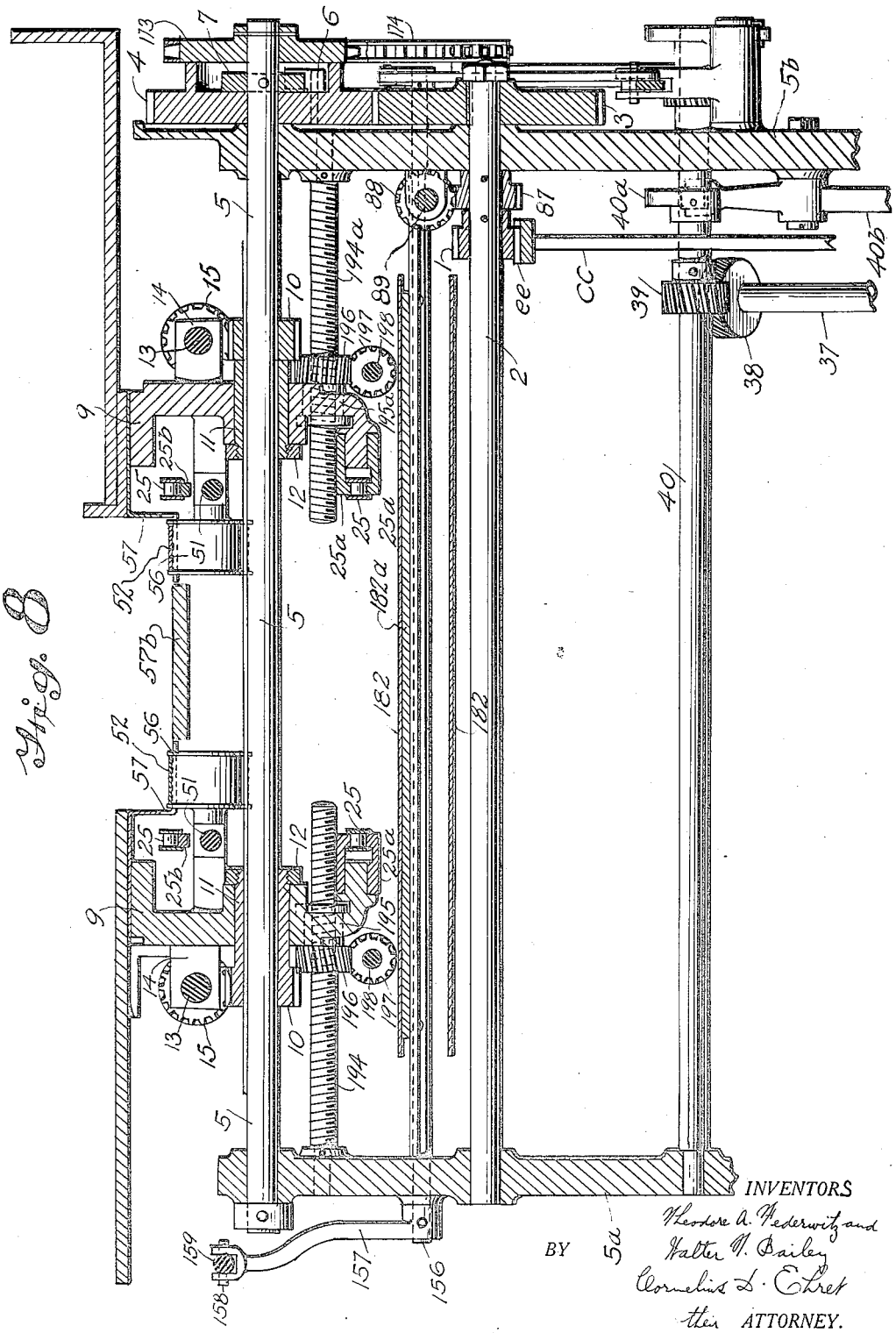

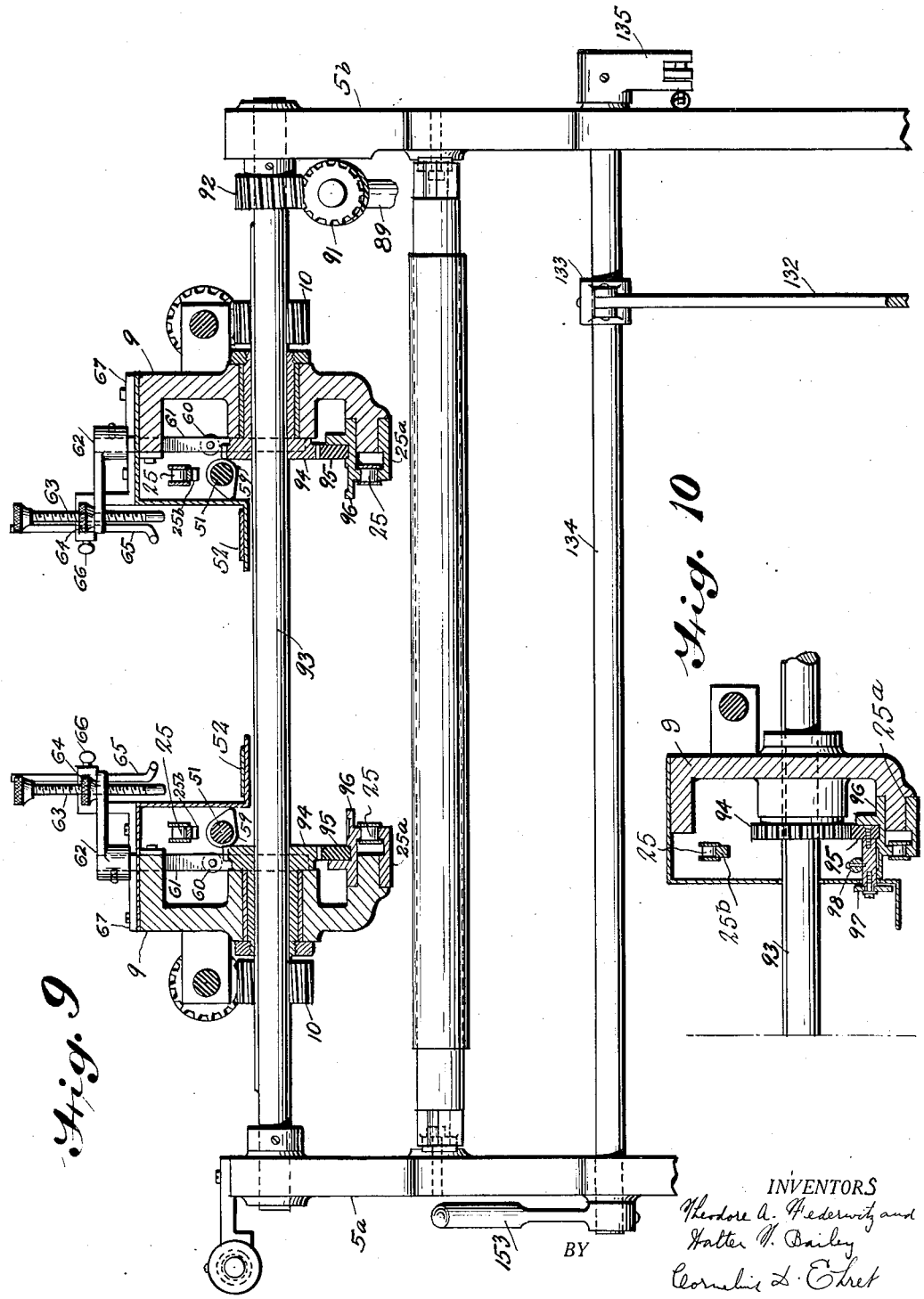

May 5, 1931.  T. A. FEDERWITZ ET AL  1,803,935
CONVEYING SYSTEM
Filed July 1, 1925   18 Sheets-Sheet 9
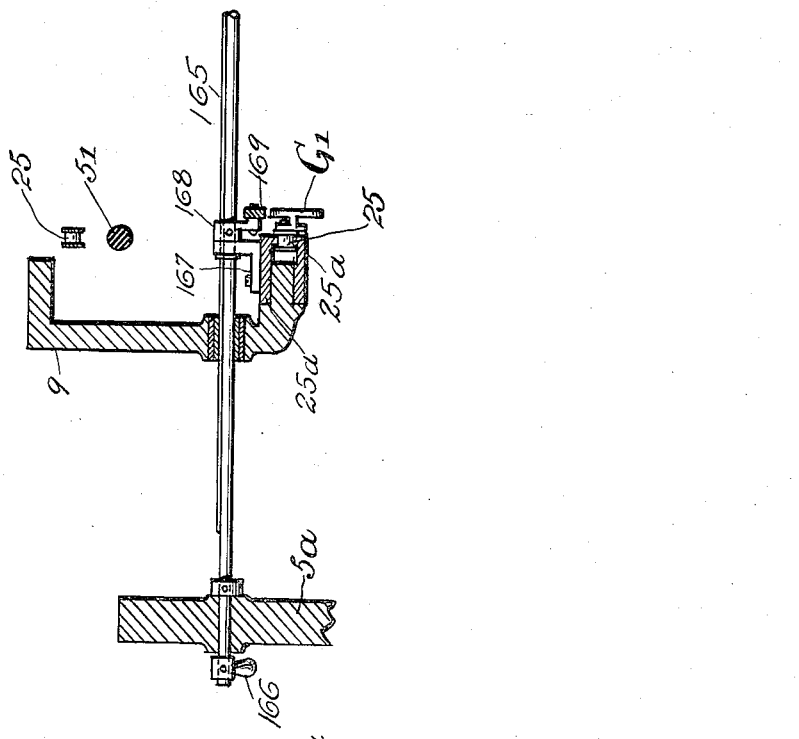
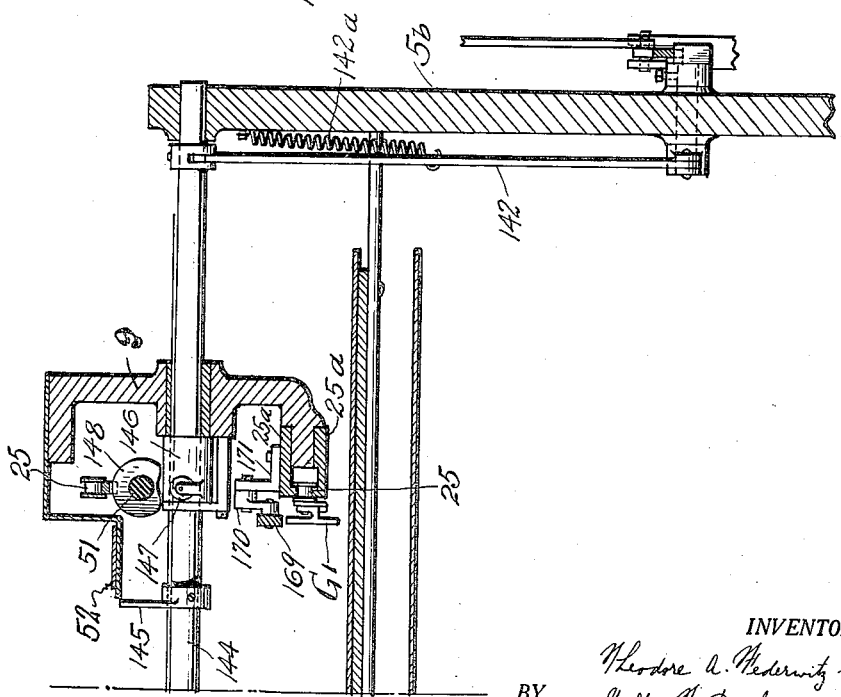
INVENTORS
Theodore A. Federwitz and
Walter V. Bailey
Cornelius D. Ehret
BY their ATTORNEY.

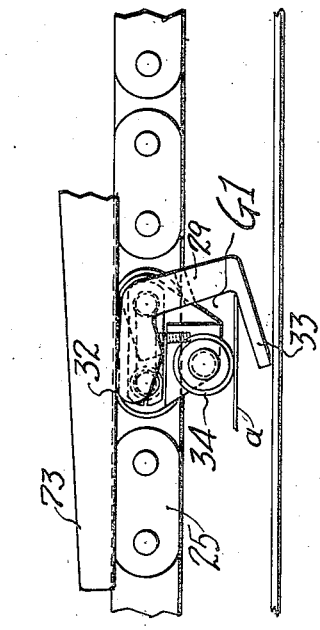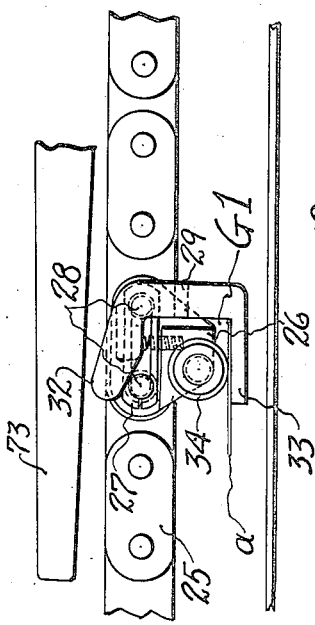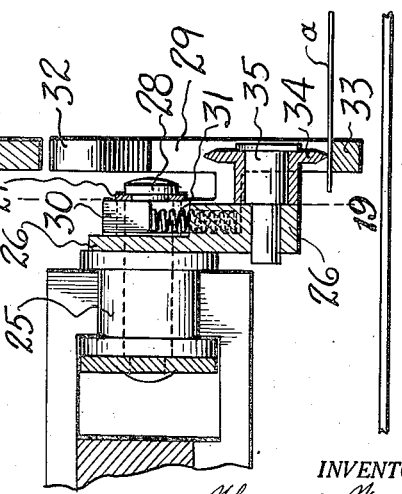

May 5, 1931.  T. A. FEDERWITZ ET AL  1,803,935
CONVEYING SYSTEM
Filed July 1, 1925   18 Sheets-Sheet 11
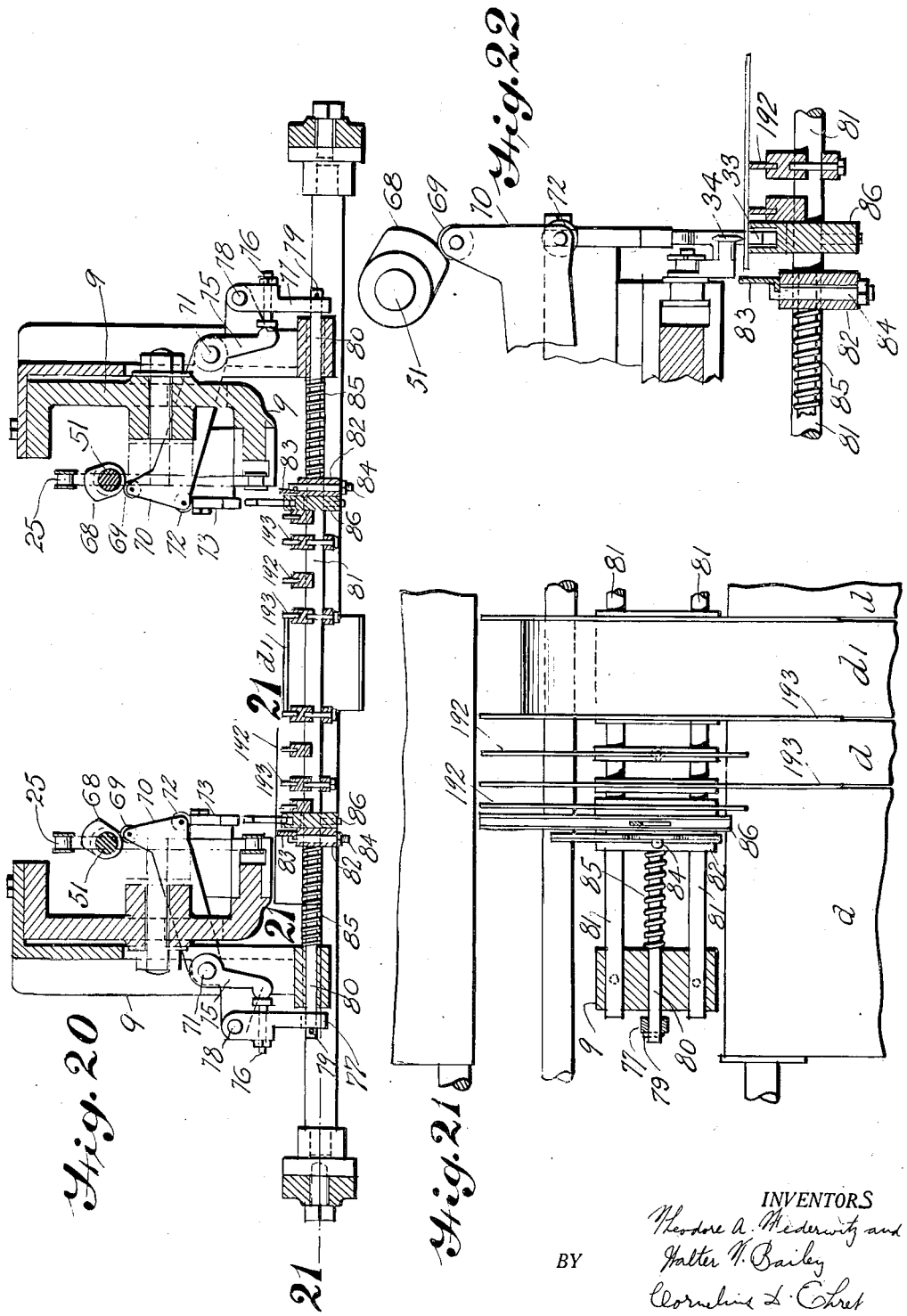
INVENTORS
Theodore A. Federwitz and
Walter N. Bailey
BY Cornelius L. Ehret
their ATTORNEY.

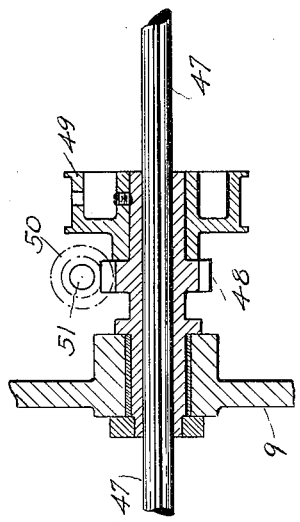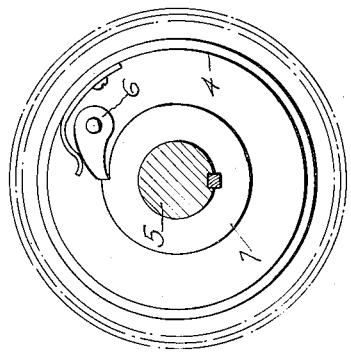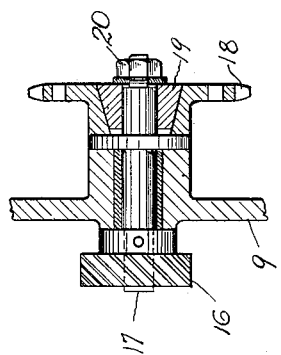

May 5, 1931.  T. A. FEDERWITZ ET AL  1,803,935
CONVEYING SYSTEM
Filed July 1, 1925    18 Sheets-Sheet 13

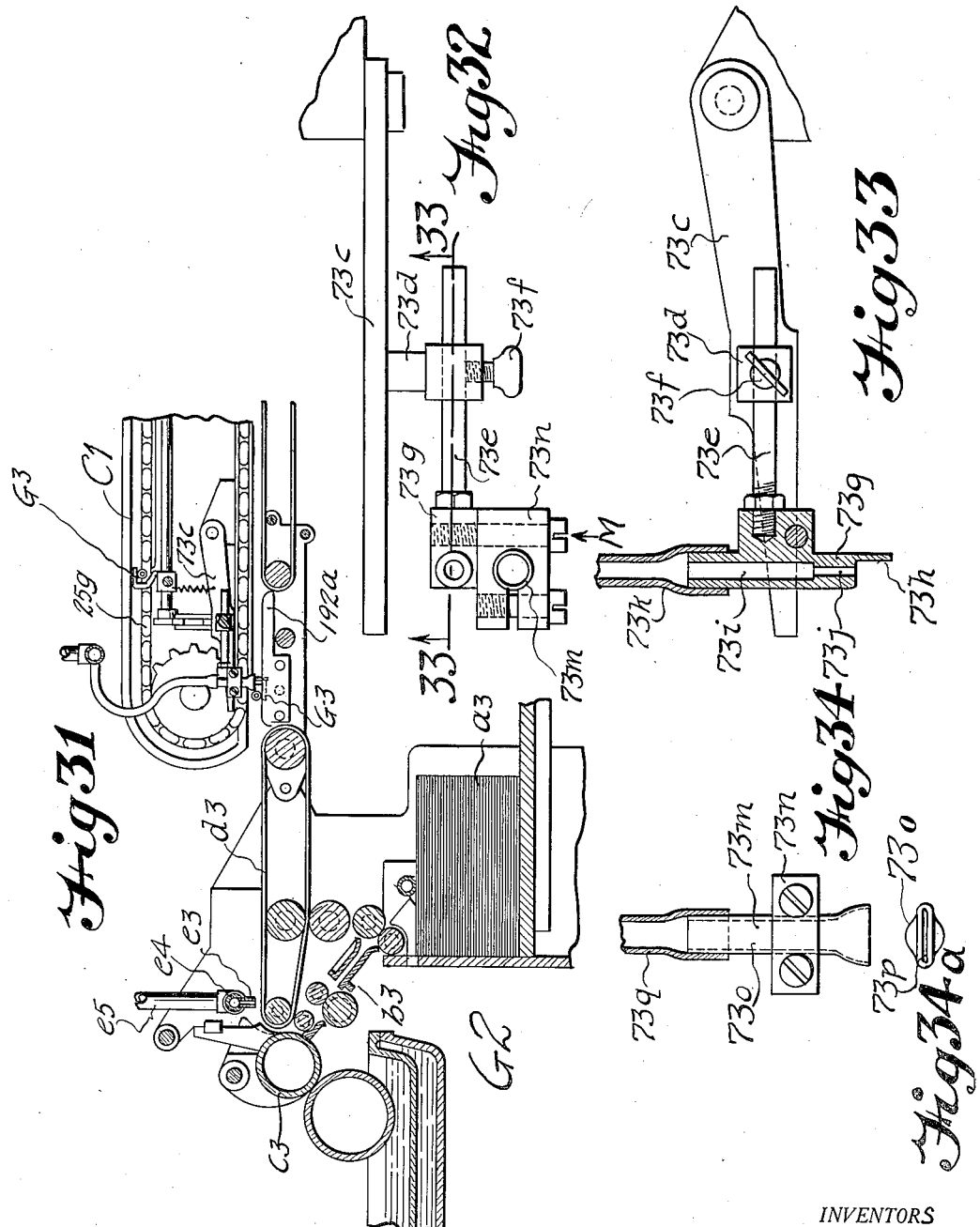

May 5, 1931. T. A. FEDERWITZ ET AL 1,803,935
CONVEYING SYSTEM
Filed July 1, 1925 18 Sheets-Sheet 15
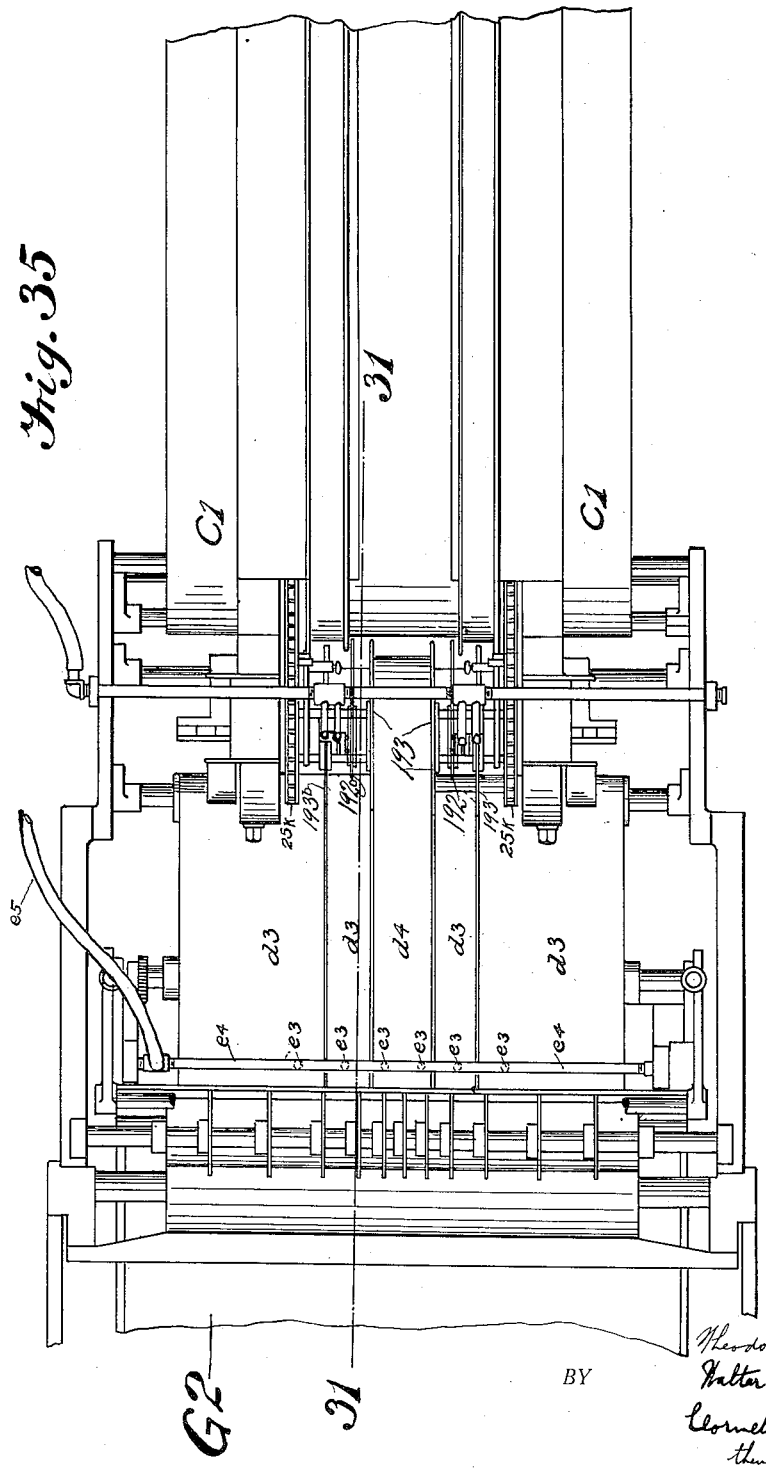

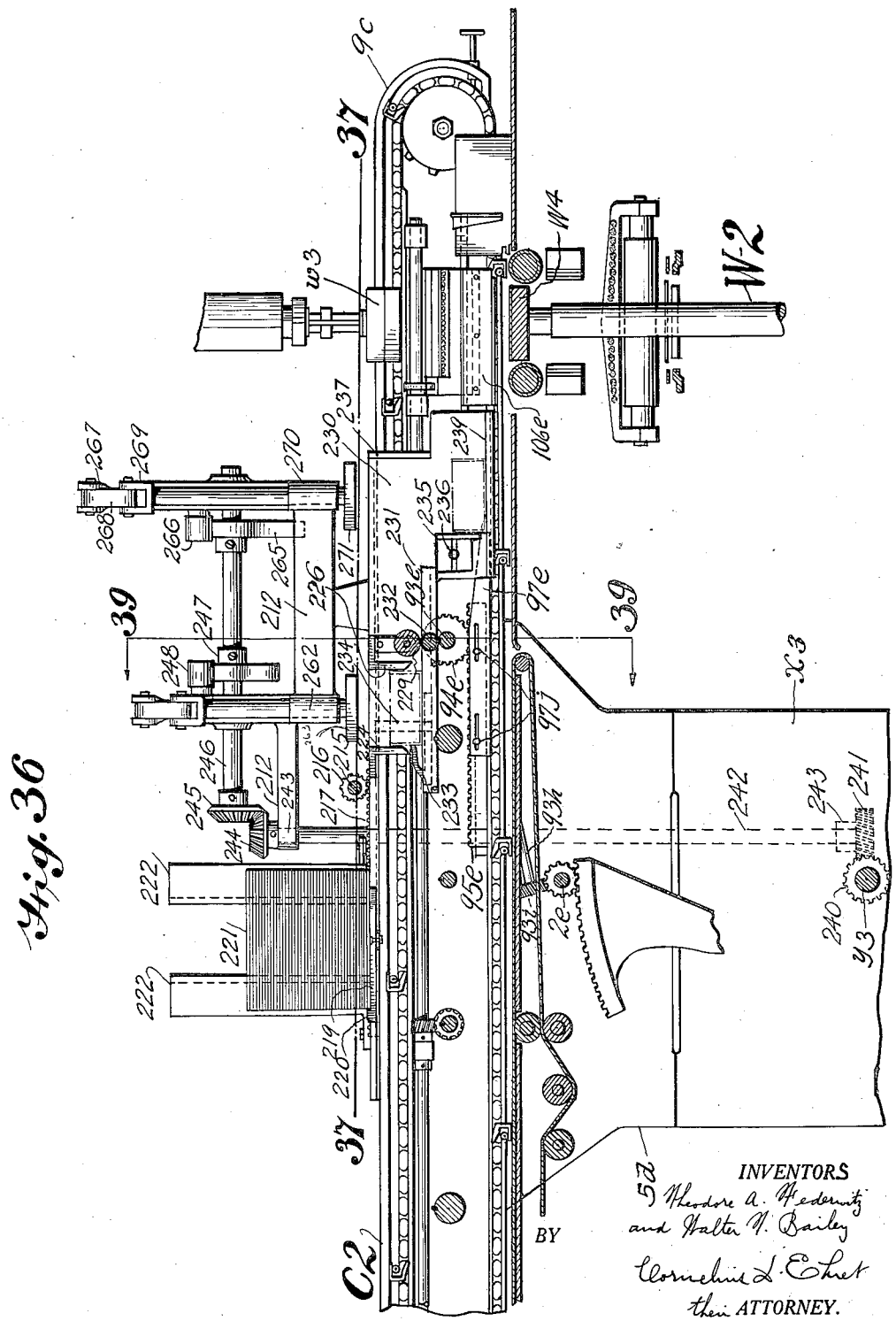

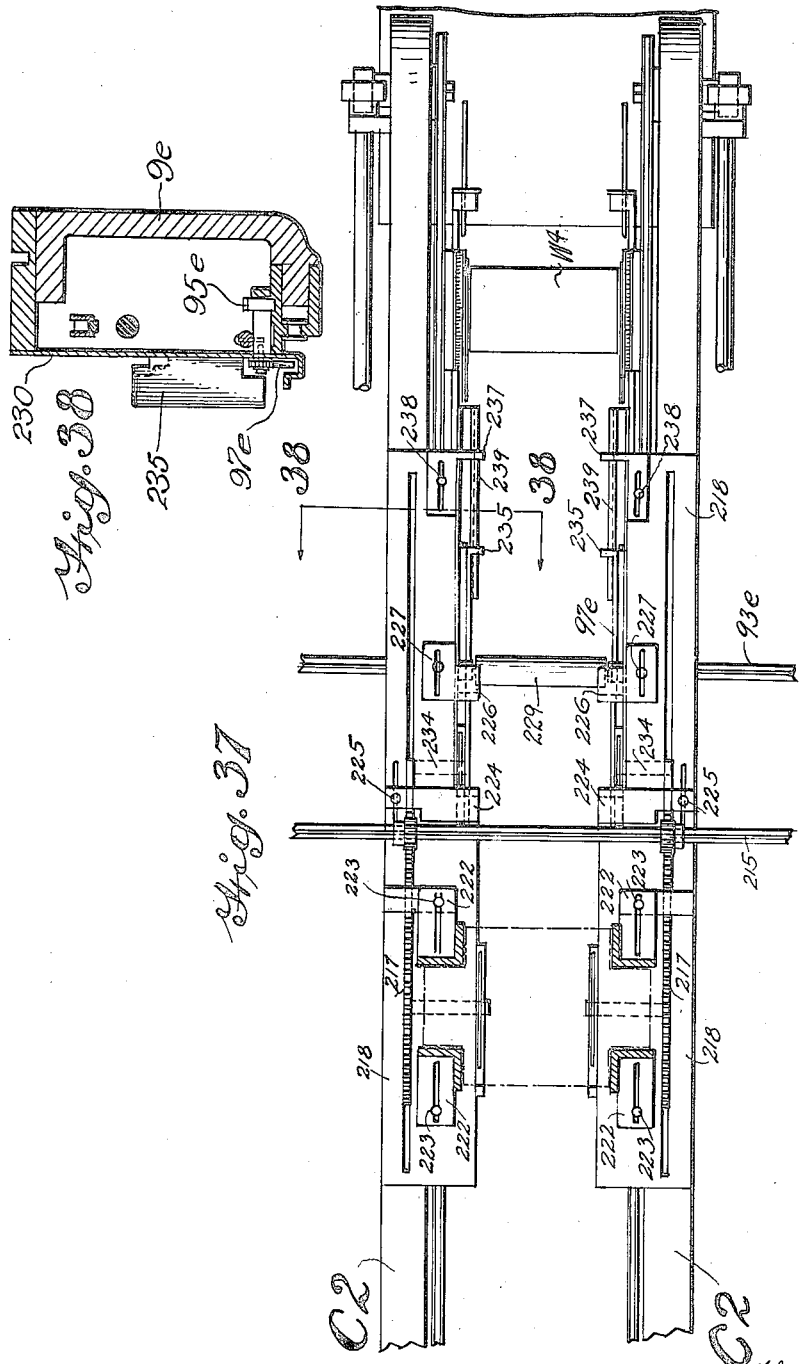

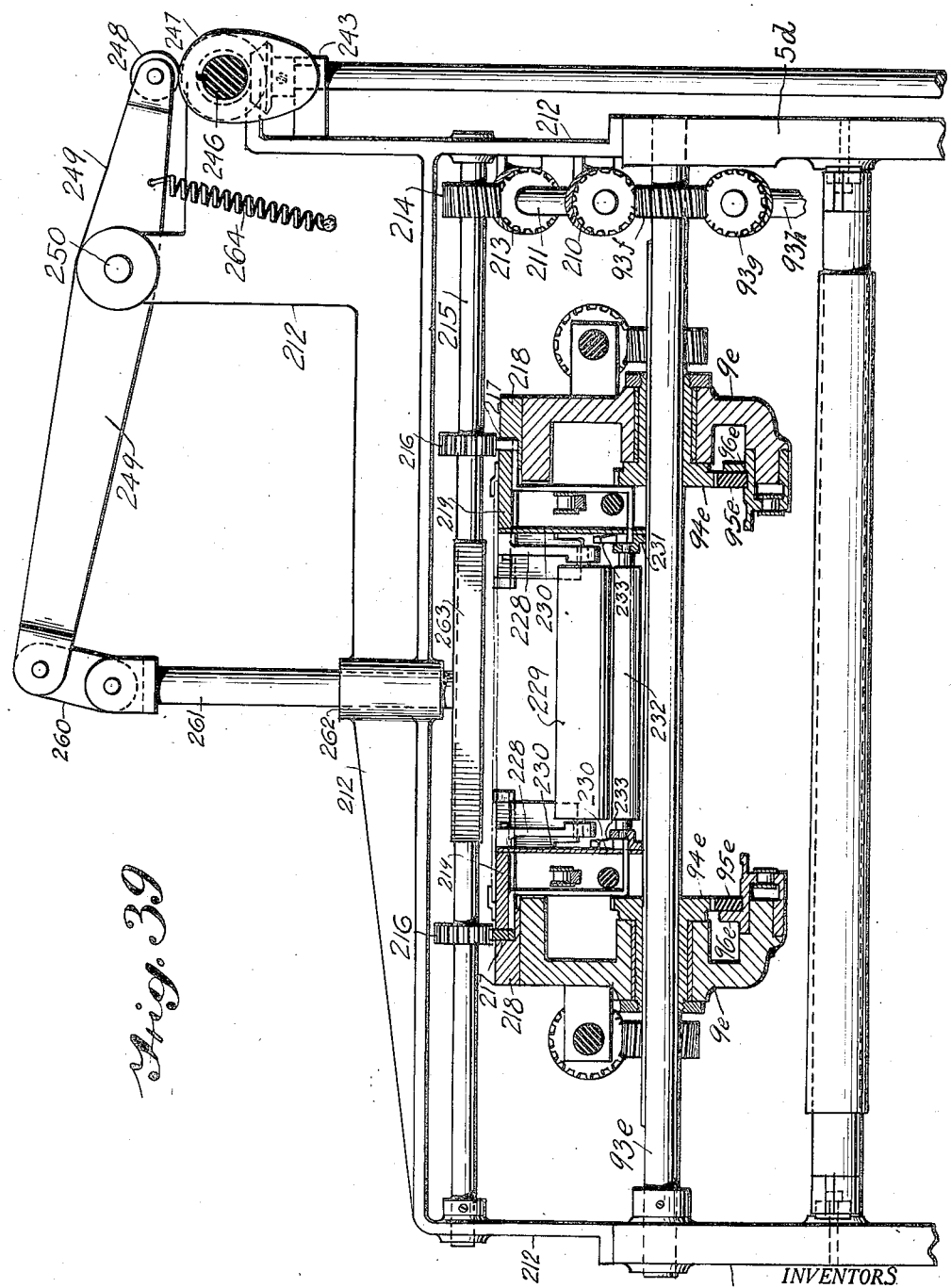

Patented May 5, 1931

1,803,935

UNITED STATES PATENT OFFICE

THEODORE A. FEDERWITZ AND WALTER T. BAILEY, OF PHILADELPHIA, PENNSYLVANIA, ASSIGNORS TO STOKES AND SMITH COMPANY, OF SUMMERDALE, PHILADELPHIA, PENNSYLVANIA, A CORPORATION OF PENNSYLVANIA

CONVEYING SYSTEM

Application filed July 1, 1925. Serial No. 40,769.

Our invention relates to the art of feeding wrappers, sheets, labels, or equivalent, hereinafter termed "sheets" or "wrappers", to a machine or unit, as a wrapping machine, a box wrapping or covering machine, a package wrapping machine, a can wrapping machine, or equivalent, hereinafter termed a "wrapping unit", or "wrapping machine", which applies the sheet to any desired structure, as a stayed box, package, can, or equivalent, hereinafter termed a "box," or to a non-stayed box, or equivalent.

In accordance with our invention, a system or combination of units, suitably synchronized or operating in definitely timed relation, automatically and successively delivers sheets, having one surface either partially or wholly coated with a suitable adhesive, as glue, to a wrapping unit in timed relation with the delivery thereto of a box, or a non-stayed box, or equivalent.

Further in accordance with our invention, a sheet stripped from suitable adhesive applying mechanism and accordingly often assuming an arc-shape is manipulated by suitable structure to lay flat, preferably upon the conveyor structure of the adhesive applying unit.

Further in accordance with our invention, suitable conveyor structure in alignment with sheet delivering structure, as the conveyor belt of a glue applying unit, is intermittently operable to seize and transport in succession individual glued sheets, the conveyor and delivering structure cooperating to align individual sheets transversely of the conveyor structure.

More particularly, adjacent the point of delivery of sheets from the gluer to the conveyor unit, there is pneumatically applied, by air jet or equivalent, to an oncoming glued sheet a force retarding the sheet as it approaches the desired position of alignment.

Further in accordance with our invention, suitable conveyor structure cooperates with suitable release structure to feed individual boxes to the wrapping unit in timed relation to the passage thereto of individual glued sheets; and more particularly suitable mechanism tends to enter the path of box feed at predetermined intervals, and upon failure in the box feed enters the path of feed to disconnect the source of power.

Further in accordance with our invention, there is provided structure for positioning a stack of sheets in advance of application of adhesive thereto, to insure their delivery to the conveyor structure in substantially predetermined position transversely of their movement thereby; and more particularly the stack positioning structure comprises elements adjustable to substantially equal extents with respect to the path of travel of the sheets both in the adhesive applying unit and in the conveyor structure.

Further in accordance with our invention, structure for conveying both sheets and boxes for blanks for non-stayed boxes to a common point of delivery is fully adjustable for manipulating sheets and boxes or blanks of different dimensions.

Further in accordance with our invention, there is correlated with the wrapper-applying structure of a wrapping machine stripper mechanism operating in timed relation with respect to structure for conveying to the wrapping unit sheets or boxes or non-stayed boxes, and movable or adjustable with the adjustable structure of the conveyor mechanism for operation upon boxes or non-stayed boxes of different dimensions; and further our invention resides in the correlation with the form block structure of a wrapping unit of stripper mechanism mounted independently thereof but operating in timed relation therewith.

Our invention resides in the system, apparatus and features of structure hereinafter described and claimed.

The apparatus herein disclosed is of the general character described in prior Letters Patent 1,403,635, January 17, 1922; and this application is in part a continuation of our prior application Serial No. 698,841, filed March 13, 1924.

For an illustration of some of the many forms our invention may take, reference is to be had to the accompanying drawings, in which:

Figure 1 is a side elevational view, partly in section, of apparatus embodying our invention.

Fig. 2 is a top plan view partly in section of the adhesive applying unit and a part of the conveyor mechanism.

Fig. 3 is a top plan view partly in section of a portion of the conveyor mechanism adjacent the wrapping machine.

Fig. 4 is a sectional view on the line 4—4 of Fig. 2.

Fig. 5 is a sectional view on the line 5—5 of Fig. 3.

Fig. 6 is a side elevational view looking in the direction of arrow A on Fig. 3.

Fig. 7 is a side elevational view looking in the direction of arrow B on Fig. 3.

Fig. 8 is an enlarged vertical sectional view on the line 8—8 of Figs. 5, 6, and 7 looking in the direction of the arrows.

Fig. 9 is an enlarged vertical sectional view on the line 9—9 of Fig. 5 looking in the direction of the arrows.

Fig. 10 is a partial vertical sectional view on the line 10—10 of Fig. 5 looking in the direction of the arrows.

Fig. 11 is a vertical sectional view on the line 11—11 of Fig. 5 looking in the direction of the arrows.

Fig. 12 is a partial sectional view on the line 12—12 of Fig. 5 looking in the direction of the arrows.

Fig. 13 is an elevational view looking in the direction of arrow C on Fig. 12.

Fig. 14 is a partial vertical sectional view on the line 14—14 of Fig. 5 looking in the direction of the arrows.

Fig. 15 is a partial vertical sectional view on the line 15—15 of Fig. 5 looking in the direction of the arrows.

Fig. 16 is an enlarged elevational view of a sheet gripping unit in closed position.

Fig. 17 is an enlarged elevation of a sheet gripping unit in open position.

Fig. 18 is a vertical sectional view on line 18—18 of Fig. 19 looking in the direction of the arrows.

Fig. 19 is a view partially in elevation and partially in section taken on line 19—19 of Fig. 18 looking in the direction of the arrows.

Fig. 20 is a vertical section view on line 20—20 of Fig. 4 looking in the direction of the arrows.

Fig. 21 is a horizontal sectional view on line 21—21 of Fig. 20.

Fig. 22 is an enlarged vertical partially sectional view on line 20—20 of Fig. 4 looking in the direction of the arrows.

Fig. 23 is a horizontal sectional view on line 23—23 of Fig. 1 looking in the direction of the arrows.

Fig. 24 is an enlarged partial side elevational view looking in the direction of arrow E on Fig. 1.

Fig. 25 is a vertical sectional view on line 25—25 of Fig. 5 looking in the direction of the arrows and showing the locking device for a driving sprocket.

Fig. 26 is a vertical sectional view on line 26—26 of Fig. 3 looking in the direction of the arrows and showing the driving arrangement for one of the one-time shafts and the box-conveying belt.

Fig. 27 is an enlarged elevational view of the arrangement for obtaining uni-directional step-by-step movement of one of the shafts extending transversely of the supporting frames.

Fig. 31 is a vertical sectional view on line 31—31 of Fig. 35 looking in the direction of the arrows and showing a modified arrangement.

Fig. 32 is an enlarged plan view of a pair of air jet tips.

Fig. 33 is a view partly in vertical section on line 33—33 of Fig. 32 looking in the direction of the arrows.

Fig. 34 is an elevational view looking in the direction of arrow M on Fig. 32.

Fig. 34a is a bottom view of an air jet tip.

Fig. 35 is a plan view of the structure of Fig. 31.

Fig. 36 is a side elevational view, partly in section of the delivery end of a conveyor unit and a feeding, bending and forming machine operating on non-stayed blanks.

Fig. 37 is a plan view partly in horizontal section on line 37—37 of Fig. 36.

Fig. 38 is a vertical sectional view on line 38—38 of Fig. 37 looking in the direction of the arrows.

Fig. 39 is a vertical sectional view on line 39—39 of Fig. 36 looking in the direction of the arrows.

Figure 28:
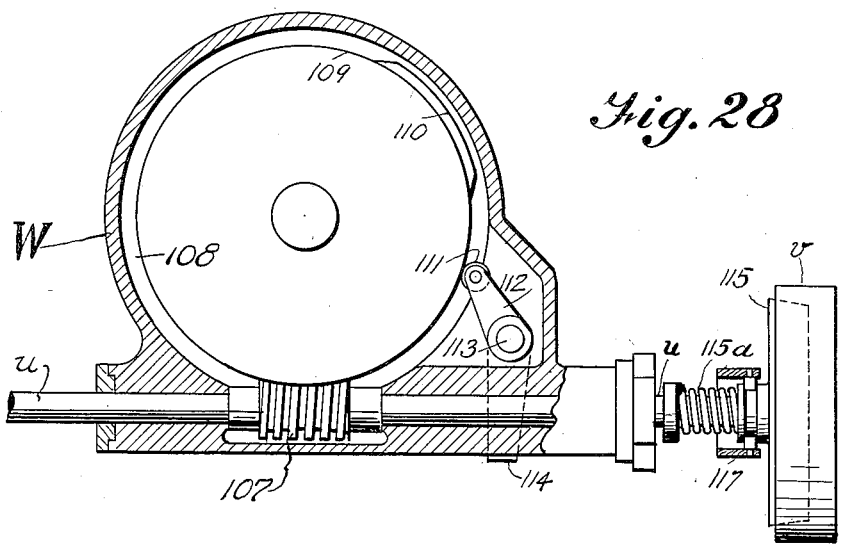
Fig. 28 is a horizontal sectional view on line 28—28 of Fig. 1 looking in the direction of the arrows and showing a part of the automatic trip mechanism.
Figure 29:
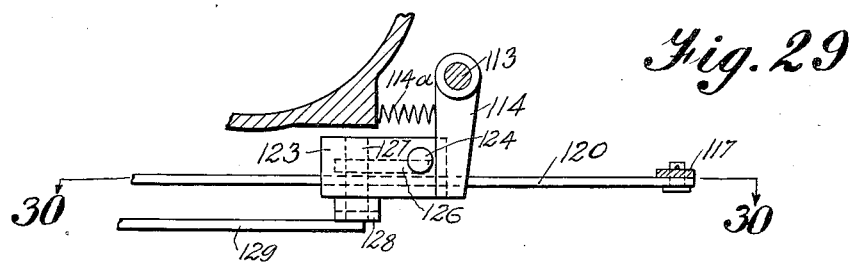
Fig. 29 is a horizontal sectional view on line 29—29 of Fig. 1 looking in the direction of the arrows and showing another part of the automatic trip mechanism.

Referring to Fig. 1 there is shown an adhesive applying unit G and a wrapping machine W, or equivalent, as aforesaid. Unit G and machine W are cooperatively related by mechanism which synchronizes the operations of movements of the unit G with the operations or movements of the machine W and by a conveying or transferring unit C delivers to the wrapping machine W boxes, or equivalent, as aforesaid and sheets, or equivalent, as aforesaid, the latter gummed or glued and delivered by the unit G to the transferring unit C.

The adhesive applying unit G may be of any suitable type capable of applying adhesive to sheets of box wrapping paper, or other suitable material, and delivering the gummed sheets in succession at uniform intervals. In the example illustrated, the unit G is of the same general type disclosed in Nitsch and Federwitz Letters Patent No. 1,472,614 granted October 30, 1923, but preferably provided with structure for flattening the gummed sheets onto the conveyor belt of the unit G and for centralizing the stack of sheets with respect to the conveyor mechanism, hereinafter described.

The wrapping machine W may be of any suitable character and in the example illustrated is broadly of the type disclosed in prior Letters Patent to Smith 691,329, and most specifically of the type disclosed in prior Letters Patent to Nitsch and Federwitz 1,540,900, and still more specifically of the character disclosed in our prior Letters Patent 1,541,036.

The conveying unit C however is of novel construction and is preferably of such form as to constitute a unit which may be added as an attachment to or a bridge for another set of machines or mechanisms, or more particularly to a wrapping machine W, or equivalent, and an adhesive applying unit G, or equivalent.

The adhesive applying unit G is driven at suitable speed by any sutable source of power and operates to move single sheets in succession from the stack $a$ of unglued sheets through the rotary feed roll mechanism designated generally at $b$ and into engagement with the gluing roll $c$ where there is applied, on one side of each sheet, any suitable adhesive, as glue. The sheets after being stripped and deflected from the glue roll $c$ are flattened onto the conveyor belts $d$ and $d1$ of the adhesive applying unit by presser wheels $e$ mounted on a shaft $e1$ journalled in the frame of the unit G and driven by friction wheels $e2$ also mounted on shaft $e1$ in turn driven by the conveyor belts $d$ (Fig. 2). Carried by the frame of the unit G are arms $f$, in which are journalled shafts $g$ and $h$ carrying idler drums or pulleys $i$ and $j$. Adjacent the gluing roll $c$ said frame supports an idler $k$ around which passes the conveyor belts $d$ and $d1$, the belts $d$ passing around the idler $j$ and the belt $d1$ passing around the idler $i$ (Fig. 2), suitably operated drive rolls $l$ being provided for driving the various belts, whereby passage of glued sheets is effected from the unit G toward the unit C. It is to be observed that belt $d1$ is longer and extends beyond the belts $d$ toward the conveying unit C for a purpose hereinafter described.

A system of the character hereinafter described is fully adjustable for manipulating sheets and boxes of different dimensions. To the end that sheets of different dimensions may be utilized, table $m$ on unit G receiving and supporting the stack $a$ of unglued sheets is provided with guide members or arms $n$ suitably secured for sliding movement on a plane surface $o$ of the frame of the unit. Arms $n$ may be adjusted toward and from each other in any suitable manner, as by utilizing threaded openings $p$ provided respectively with oppositely pitched threads with which cooperate the rod $q$ likewise provided with oppositely pitched threaded portions, and a serrated disk $r$ upon manipulation, imparting rotative movement to said rod, (Figs. 23 and 24). It is to be understood that each arm $n$ is spaced substantially an equal distance from a vertical plane passed centrally and longitudinally through the belt structure $d$ and $d1$ and, due to the adjusting arrangement described, arms $n$ always remain at respectively equal distances from that plane. If desirable, arms $n$ may be releasably secured in any adjusted position by a clamp $s$ attached to the frame portion $o$ by bolt $t$.

The unit C comprises a base $x$ supporting the sheet and box conveyor mechanism and associated structure and is provided with bearings for a shaft $y$ carrying a worm gear $z$ and a cam $aa$. Bearings $bb$ on base $x$ pivotally support an oscillatory arm $cc$ carrying a cam roller $dd$ substantially intermediate its ends, and a gear quadrant $ee$ adjacent its other end. Worm gear $z$ meshes with and is driven by worm $ff$ mounted on and driven by shaft $u$ as hereinafter described.

Oscillatory movement imparted to arm $cc$ in turn oscillates gear 1 keyed to shaft 2. Gear 3 likewise keyed to shaft 2 (Fig. 6) meshes with gear 4 freely rotatable on shaft 5 disposed in bearings in supporting frames $5a$ and $5b$ carried by the frame $x$, the supporting frames also providing bearings for the shaft 2. A pawl 6 pivoted to gear 4 engages a one toothed ratchet 7 keyed to shaft 5 (Fig. 27), imparting rotative movement thereto during rotation of gear 4 in one direction and upon reversal of the direction of rotation of gear 4, pawl 6 rides over the now stationary surface of ratchet 7. In this manner oscillatory rotative movement applied to gear 2 causes intermittent, step-by-step rotation of shaft 5 always in the same direction.

Supporting frames $5a$ and $5b$ are tied together by supporting members 8 serving to support and guide conveyor frames 9 mounted on said members 8 by sleeves $9a$ forming elongated bearings for the conveyor frames, which may be adjusted longitudinally of members 8 as hereinafter described and fixed in adjusted position by set screws $9b$ (Fig. 3).

*The sheet conveyor mechanism*

Gears 10 respectively mounted in bearings in the conveyor frames 9 (Fig. 8) are provided with sleeves 11, each splined to shaft 5 and held in position in the bearings by collars 12. A pair of shafts 13 (Figs. 6 and 7) respectively rotatable in bearings 14 on conveyor frames 9 are provided adjacent each end with gears 15. One shaft 13 is disposed exteriorly of one of the conveyor frames 9 and the other is disposed exteriorly of the other conveyor frame (Fig. 8) each shaft extending in the same direction longitudinally of and toward the wrapping machine end of the conveyor frames. Gears 15 on the ends of the shafts 13 adjacent the shaft 5 mesh with gears 10 aforesaid while the gears 15 on the ends of the shafts 13 adjacent the wrapping machine mesh with gears 16 keyed to studs 17 rotatably mounted in bearings in the conveyor frames 9 (Figs. 6 and 7), each stud carrying a drive sprocket 18 adjustably secured thereto by a tapered plug 19 and a nut 20 (Fig. 25). Rotatably mounted on the conveyor frames 9 adjacent the unit C are the idler sprockets 21 mounted on studs 22 lying in slots 23. If desired, each stud may be provided with a threaded opening receiving a screw 24 (Fig. 2) which upon proper adjustment will shift the studs longitudinally of the conveyor frames to tighten the sprocket chains 25, belts or equivalent mounted respectively on the pairs of sprockets 18 and 21. Suitable chain guides or supports 25a (Fig. 8) are disposed adjacent the bottom of conveyor frames 9 for supporting and guiding the chains while moving toward the wrapping machine W, bars 25b mounted as hereinafter described respectively supporting and guiding the chains in their path of travel toward the unit G.

Spaced equidistantly along chains 25 parallel to a vertical plane extending at right angles to the longitudinal axis of the conveyor frames 9 are the pairs of sheet gripper units designated generally at G1 (Figs. 1 and 16 to 19 inclusive), the distance along each chain 25 between neighboring gripper units being at least as great and somewhat greater than the maximum width of sheet to be operated upon. Each gripper preferably takes the place of a side link of one of the chains and comprises a plate bracket 26 secured by spring clamps 27 to chain link pins 28, one of which forms a bearing for each gripper palm 29, provided with the tail 30 engaged by a spring 31 seated in a recess of the plate bracket 26, and, therefore, constantly urged in one direction.

Gripper palm 29 also is provided with an arm 32 for a purpose hereinafter described and with a palm proper 33, the sheet a eventually being gripped between the latter and a knife-edged surface 34, preferably a circular disk or wheel rotatably mounted on a stud 35 in the plate bracket 26.

In operation, the oncoming glued sheet is brought forward by the conveyor mechanism of the unit G and is thrust against the vertical portion of a pair of gripper palms 29. Should the sheet be laterally displaced with respect to a line extending at right angles to the longitudinal axis of the unit C, its advanced corner will meet and be abruptly stopped by one of the gripper palms 29 whereupon the lagging corner will be carried forward into engagement with the other transversely aligned gripper palm by the continuously rotating belts d and d1 which will engage and slip under the bottom surface of the glued sheet. The sheet may perhaps be of such narrow width that it will have passed beyond the belts d in which case the longer belt d1 still slipping under the bottom surface of the sheet will perform the aligning function, the result being that the sheet is caused to assume its proper position, i. e. one in which its forward edge is parallel to a line extending at right angles to the longitudinal axis of the unit C. However, if for any reason the sheet is still not properly aligned, the pivoted gripper palms 29 upon release of the gripper operating members, hereinafter described, will travel in the arcs of a circle toward the left (Fig. 17) and cause proper alignment by thrusting an advanced corner of the sheet a small distance backward toward the unit G.

The member 34, as stated, is preferably circular and is provided with an edged surface for effecting clamping engagement with the glued sheet (Fig. 18). In normal operation and due to the rotatable mounting of members 34, it will usually happen that the same portion of the periphery of this member does not successively engage the glued surfaces of succeeding sheets. For example, in Fig. 16, a sheet has been gripped between member 34 and gripper palm 29 and this sheet will be transferred to a point of release by the conveyor chains whereupon the empty gripper unit G1 will return for another sheet. During the course of its travel, member 34 will be rotated, perhaps by frictional engagement with the glued surface of the sheet when entering and leaving the gripper. At any rate, it usually happens that the rotatable member 34 of the empty gripper unit when in position to receive a freshly glued sheet is in a different position from that assumed in transferring the preceding sheet. In this manner glue or other adhesive adhering to the member 34 at any one point usually will dry and peel before that point functions to again grip a sheet.

Although we have illustrated and described the unit G1 as being used with a sprocket chain and being in effect an integral part thereof, it is to be understood that gripper units of this character are not limited to use in this manner, but are capable of use in other types of apparatus, and with supporting members other than sprocket chains.

The sheet conveyor mechanism, the sheet gripper, and related constructions are claimed in our co-pending application Serial No. 137,668, filed February 25, 1926.

Sheet gripper release mechanism

Shaft 5 rotating uni-directionally and step-by-step, as aforesaid, imparts uni-directional rotative movement to the sprockets 18. In this manner the chains 25 and units G1 move step-by-step successively carrying individual sheets from the unit G toward the unit W. When a sheet has been suitably positioned with respect to the wrapper-applying mechanism, for example, when it has been brought to position below the upper form block structure $w$ and above the lower form block or platen $w1$ of the unit W, a combined arrangement operates to release the sheet gripper, to temporarily hold the released sheet and to guide ejected boxes. To this end, slotted gripper release members $25c$ having downwardly extending cams $25s$ are slidably clamped respectively to the conveyor frames 9 by bolts $25d$. The position of cams $25s$ with respect to said frames is controlled by screws $25e$ mounted thereon and threaded in the gripper release members, the degree of adjustment in each case depending upon the width of the sheets passing through the machine. It is to be understood that cams $25s$ are maintained parallel to a vertical plane extending at right angles to the longitudinal axis of the conveyor frames and operate respectively to release the glued sheet by depressing arms 32 of the gripper units G1 when said arms in their travel come in contact with the respective cams $25s$.

Sheet holding plates $25f$ secured to each gripper release member $25c$ and movable therewith have slots $25g$ opening into suction holes $25h$ in their lower surfaces communicating with suction pipe $25i$ leading to a suitable suction pump (not shown). When being released from the unit G1, as aforesaid, the forward edge of the glued sheet enters slots $25g$ where it is temporarily held by suction until the upper form block structure $w$ descends. It is to be observed that the inner surfaces of the sheet holding plates $25f$ form a guide channel through which the ejected boxes pass (Figs. 12 and 13).

The one-time mechanism

A pair of cam-carrying shafts, hereinafter specifically described, are journalled in the conveyor frames 9 substantially parallel to each other and to the conveyor frames and are so correlated with the driving mechanism of the wrapping machine W that one rotation of each is effected in response to one cycle of the wrapping machine W. These shafts in turn control certain instrumentalities and, therefore, the time of actuation of such instrumentalities is dependent upon the position of the operating parts of the wrapping machine.

Proceeding to a description of the arrangement for operating said shafts and referring to Fig. 1 wherein the shaft $y$ of the unit C is shown as carrying a spiral gear $z1$ engaging a spiral gear 36 keyed adjacent one end to a shaft 37 mounted in bearings in the supporting frames $x$ and $5b$, the latter shaft adjacent its other end carrying a spiral gear 38 meshing with a corresponding spiral gear 39 keyed to shaft 40 mounted in bearings in the supporting frames $5a$ and $5b$. A spiral gear 41 keyed to shaft 40 meshes with a spiral gear 42 carried by shaft 43 mounted in bearings 44 on the exterior of the supporting frame $5b$ (Fig. 6). Adjacent its other end shaft 43 carries a spiral gear 45 meshing with a spiral gear 46 keyed to shaft 47 likewise mounted in bearings in the supporting frames $5a$ and $5b$. Gears 48 mounted in bearings in the conveyor frames 9 and splined to shaft 47 mesh respectively with gears 50 keyed to shafts 51, hereinafter referred to as one-time shafts, disposed longitudinally of the frame in bearings $51a$ (Figs. 3 and 26), the latter supporting bars $25b$ in turn respectively supporting chains 25 when traveling toward the unit G. It is to be understood, however, that the spiral gears $z1$ and 36, the shaft 37 and the train of shafts and gears as described aforesaid leading to and including gears 51 are in reality one-time shafts, and, if desired, suitable controls may be effected by any part or parts of this train and such controls will be actuated in synchronism with the operating parts of the wrapping machine W.

Synchronizing mechanism for the unit G

Secured to shaft 40, which as stated aforesaid rotates once during each cycle of the wrapping machine W is a cam $40a$ which rocks a bell crank lever $40b$ pivoted to supporting frame $5b$ (Fig. 1). A hook $40c$ is fastened to a rod, link, or equivalent $40d$ pivoted adjacent its other end to a lever $40e$, movement thereof causing a cycle of operation of the unit G whereby a sheet is glued and delivered to the belt structure of said unit G. It is to be understood that cam $40a$ is so positioned on shaft 40 that the unit G will be successively actuated at proper times to eventually cause individual sheets to reach the wrapping machine W at the proper time for coaction with the form block structure $w$ and $w1$.

The box conveying mechanism

Pulleys 49 secured respectively to gears 48 (Fig. 26) respectively drive box conveying belts 52 bands or equivalent continuously, an idler pulley 53 keeping each belt in engagement with the drive pulley 49 (Fig. 1). Belts 52 pass over front and rear idler pulleys 54 and 55 and intermediate idler pulleys 56 (Figs. 1 and 8). Angular members 57 disposed on the conveyor frames 9 serve as supports for the box conveying belts (Figs. 1 and 8) and also form a guide channel for the boxes which are placed on the belt by an attendant, or conveyed thereto by suitable conveyor mechanism from a source of supply (not shown), the direction of belt rotation being such that the boxes move toward the machine W in a single column, each box in turn engaging certain release mechanism intermittently operable to permit renewed passage of a box toward the said machine W at the proper period in each cycle of operation. If desired, a guard plate 57b may be disposed between the horizontal portions of members 57 below belts 52, the guard plate serving to prevent the boxes from falling into the space between the conveyor frames 9 (Fig. 8).

*The box feed mechanism*

Cams 59 on the one-time shafts 51 respectively engage rollers 60 on vertically reciprocatory rods 61 guided and supported in the conveyor frames 9 (Fig. 9). Rods 61 carry arms 62 threaded to receive adjustable release pins 63 held in adjusted position by locks nuts 64 whereby boxes of different dimensions may be accommodated. It is to be understood that cams 59 will be positioned on one-time shafts 51 so as to raise the release pins once in the cycle of operation of the machine W such that the box after passing beneath the release pins will eventually reach the machine W at the proper time to be engaged by the form block structures w and w1.

Disengagement of individual boxes from release pins 63 is effected by stripper rods 65 adjusted to conform with the position of release pins 63 and held in adjusted position by set screws 66, the rods mounted respectively on brackets 67 suitably supported on the conveyor frames 9.

*Gripper actuating mechanism*

Cams 68 mounted, respectively, on the one-time shafts 51, engage the respective rollers 69 carried, respectively, by levers 70, each fixed on a shaft 71 rotatably mounted in a conveyer frame 9, Figs. 20 and 22. A roller 72 on each lever 70 spaced from roller 69 engages a gripper-operating member 73 pivoted at 73a in a conveyer frame 9, each member 73 being biased into engagement with a roller 72 by a spring 74, Figs. 4, 20 and 22.

Secured respectively to shafts 71 are the toe levers 75, each at one end engaging a screw 76 adjustable in a fork lever 77, which, as illustrated in Fig. 20, is pivoted to a conveyer frame 9 at 78. The forked end of each lever 77 engages a pin 79 mounted adjacent the end of a rod 80 slidable in a conveyer frame 9 and received in the forked end of a lever 77. Slidable on guide rods 81 carried by the conveyer frames 9 are the side registering palm holders 82, each supporting a palm 83 held in adjusted position by a clamp bolt 84 or the like, Figs. 20 and 21. Encircling each rod 80 is a helical spring 85, Figs. 20, 21 and 22, utilizable for biasing a palm holder 82 and its palm 83 toward the longitudinal center of the conveyer unit C. Once for each cycle of operation of the herein disclosed system, the ends of levers 75 are moved outwardly, Fig. 20, under the influence of cams 68 on one-time shafts 51, thereby moving the palm holders 82 from the longitudinal axis of the conveyer unit C against the expansive force of the respective helical springs 85. This occurs prior to the delivery of a glued sheet to the awaiting pair of sheet grippers at the receiving end of the conveyer unit C. After the glued sheet has been deposited in said sheet grippers, but before the palms 33 close thereon, cams 68 move beyond roller 68 and helical springs 85 move palm holders 82 toward the longitudinal axis of the conveyer unit C, and in so doing, if the sheet is displaced laterally of the conveyer unit C, one palm 82 or the other, or both, engages or engage a side or sides of the sheet to align the same with respect to said longitudinal axis of the conveyer unit C.

In the region of sheet discharge from the belts of the unit G, there may be provided troughs 86, Fig. 22, supported by rods 81 and having their upper surfaces in horizontal alignment with the guiding members 192. When a pair of sheet grippers G1 has been moved into sheet-receiving position at the receiving end of the conveying unit C, operation of the gripper-operating member 73 causes descent of palm members 33 into the respective troughs 86. Thereafter, the glued sheet is delivered along the guide members 192 and the upper surfaces of troughs 86 into a position above the palm members 33, the ends of the latter subsequently swinging upwardly under the influence of the springs comprised in the respective gripper units G1 to grip a sheet between the same and the disk 34.

*Box pusher bar mechanism*

Referring to Fig. 6, spiral gear 87 keyed to shaft 2 meshes with spiral gear 88 keyed to shaft 89 mounted in bearings 90 on the supporting frame 5b. Spiral gear 91 likewise keyed to shaft 89 adjacent its other end meshes with spiral gear 92 keyed to shaft 93 mounted in bearings in the frames 5a and 5b.

Gears 94 provided with sleeves rotatably mounted respectively in the conveyor frames 9 are splined to shaft 93 and mesh respectively with racks 95 slidable in tracks 96 likewise mounted in the conveyor frames (Figs. 9 and 10). Box pusher bars 97 are adjustably secured to the respective rack structures by pin-and-slot connections 97a, and the oscillatory rotative movement imparted to shaft 130

93 through the chain of connections from arm cc imparts alternate movement of the box pusher bars toward and from the form block structure w and w1. As shown in Fig. 1, these bars are in the advanced position toward said form block structure and while remaining momentarily stationary a box is fed down and comes to rest on their upper surfaces. Upon retraction of the rods, the box drops onto shelves 57a formed integral with member 57 (Fig. 3) from where it is pushed by the pusher bars under the form block structure in timed relation to the movements thereof.

Ejector rods 98 secured to the respective rack structures and movable therewith are provided adjacent their ends with ejecting palms 99 to eject boxes stripped from the form block structure of the machine W.

Box stripping mechanism

Cams 100 mounted respectively on the one-time shafts 51 (Fig. 11) engage rollers 101 carried respectively on plates 102 pivoted to the respective conveyor frames 9 at 103 on either side of the path of travel of the upper form block structure w, each plate moving against a retractive spring 104. A stripper brush bracket 105 is adjustable vertically on each plate 102 and comprises a longitudinally extending row of bristles 105a resting beneath a reinforcing bar 105b. Plates 102 also respectively carry flexible box receiving plates 106 spaced beneath each row of bristles.

As shown in Fig. 11, pusher bars 97 will advance the sides of a box into engagement with the flexible plates 106 and the latter will temporarily hold the box until engaged by the upper form block structure w whereupon the plates will yield and permit downward passage of the box. While remaining lowered in the machine W, cams 100 rock the plates 102 and in so doing the receiving plates 106 are moved away from, and the stripper bristles 105a into, the path of travel of the box on the upper form block structure w. In this manner, the box will rise unimpeded by the plates 106 and be stripped from the plunger by bristles 105a, whereupon it will fall onto the lower platen from whence it is ejected by the rods 98. In performing the stripping operation, bars 105b restrain the bristles from yielding unduly whereby the box is more readily stripped from the upper form block structure w.

Stopping mechanism effective upon failure of box supply

Figure 30:
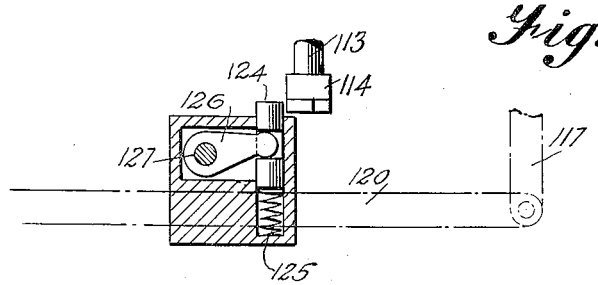
Fig. 30 is a vertical sectional view on line 30—30 of Fig. 29 looking in the direction of the arrows.

The drive pulley v of wrapping machine W is driven by any suitable source of power (not shown) and through the shaft u, power is transmitted to the units C and G for effecting the various synchronizing operations and also for effecting the various driving arrangements of the unit C. Referring to Figs. 1, 28, 29 and 30, shaft u carries worm 107 meshing with worm gear 108 carrying cam 109 centrally mounted in the frame of the wrapping unit and making one revolution for each cycle of the unit. Strap 110 on cam 109 engages roller 111 carried by lever 112 keyed to shaft 113 to which a pawl 114 is likewise keyed and engaged by a spring 114a to hold roller 111 against cam 109. The movable clutch element 115 splined to shaft u is urged into engagement with the drive pulley v in any suitable manner, as by spring 115a. A bracket arm 116 mounted on the frame of the wrapping machine W carries a pivotally mounted clutch lever 117 having pins 118 engaging movable clutch element 115. Link 120 pivoted to lever 117 is connected adjacent its other end to lever 121 pivoted to shaft 122 mounted in bearings in the frame of the wrapping machine W. A trip block 123 secured to link 120 carries a trip pin 124 normally held in one position by a spring 125 (Fig. 30). A pawl 126 secured to shaft 127 is mounted in the trip block 123 and is adapted to actuate the trip pin 124.

When spring 125 is in its expanded position, pin 124 extends upwardly above the surface of trip block 123 (Fig. 30), and when the pawl 114 is rocked by strap 110 it will engage the pin 124 and the trip block will be shifted bodily toward the left (Fig. 30) thereby rocking lever 117 to withdraw the clutch element 115 against spring 115a and disengage shaft u from the source of power. However, if pin 124 is withdrawn into trip block 123, pawl 114 will oscillate freely without affecting the trip block and operation of the machine will continue. It becomes apparent, therefore, that the position of pin 124 governs the operation of the machine.

The position of pin 124 may be regulated in any suitable manner depending on the character of the control desired and in the example illustrated, operation or non-operation of the machine is determined by the presence or absence of a box in a predetermined position on the box conveyor belt.

To this end shaft 127 supporting pawl 126 carries a lever 128 pivoted to link 129 in turn pivoted adjacent its other end to lever 130 keyed to shaft 122 (Fig. 1). On the opposite side of the machine W, lever 131 secured to shaft 122 is pivoted to link 132 pivoted adjacent its other end to lever 133 secured to shaft 134 mounted in bearings in the supporting frames 5a and 5b (Figs. 1, 6 and 9). A lever 135 is secured to shaft 134 exteriorly of the supporting frame 5b and a spring 136 secured at one end to the lever 135 is attached to a bracket 136a on the supporting frame 5b (Fig. 6) and cooperates with spring 125 to move the trip pin 124 into the path of travel of pawl 114.

Referring to Fig. 6, trip link 137 having a notch 138 is pivoted to lever 135 and in engagement with the notch is a latch 139 fixed to shaft 140 mounted in a bearing in the supporting frame 5b. A lever 141 also secured to shaft 140 is pivoted to a link 142, a spring 142a (Fig. 14) secured to said link and the supporting frame 5b tending to draw link 142 upwardly (Fig. 6). Link 142 adjacent its other end is pivoted to lever 143 secured to shaft 144 mounted in bearings in the supporting frames 5a and 5b, the shaft 144 carrying a laterally adjustable tell-tale lever 145 (Figs. 1, 6, 14 and 15).

A cam lever 146 pivotally mounted in that conveyor frame 9 adjacent the frame 5b and splined to shaft 144 (Fig. 14) carries a cam roller 147 actuated by a cam 148 on one of the one-time shafts 51, in the example shown, the one-time shaft 51 adjacent the frame 5b.

A pin 149 on trip link 137 engages a bell crank lever 150 pivoted in the frame 5b (Fig. 6), the bell crank adjacent its other end carrying cam roller 151 engaging cam 152 on shaft 40.

The tell-tale lever 145 secured to shaft 144 constantly tends to rise above the plane of the box conveying belts due to the tension exerted by spring 142a transmitted thereto from link 142, upward movement normally being prevented, however, by cam 148 when its high point is in engagement with the cam lever 146 likewise secured to shaft 144. However, when the low point of said cam is in the position shown in Fig. 14, and this is arranged to occur while cam 59 is disengaged from roller 60 (Fig. 9), so that a box, if present, will be held by the release pins 63, upward movement of the tell-tale lever will depend solely on the presence or absence of a box beneath said release pins 63.

If a box is in position, the top surface thereof will engage the strippers 65 when the bottom surface is engaged by tell-tale lever 145. The effect of spring 142a tending to raise the tell-tale lever is insufficient to cause damage or deformation to the box bottom, and, therefore, under the conditions stated the tell-tale lever will be prevented from rising due to the presence of a box. The result is that latch 139 is not withdrawn from notch 138 and spring 136 and 125 are not rendered effective to raise the stop pin 124 (Fig. 30) and stop the machine.

Should the space above the tell-tale lever 145 be vacant, when cam 148 is on its low point, the tell-tale lever will rise unimpeded, latch 139 will be withdrawn from notch 138, and springs 136 and 125 will become effective to raise the stop pin 124 (Fig. 30) in which case the clutch element 115 will be disengaged and the machine stopped, in the manner described aforesaid.

Since the spring 142a is necessarily of a character that is incapable of exerting a force of large magnitude, it is necessary to overcome the binding engagement between the latch 139 and the walls of the slot 138 created by the springs 136 and 25 during the period of time that cam 148 is on its low point and the position of tell-tale lever 145 determined by the presence or absence of a box. To this end, and at that time, cam 152 on shaft 40 is timed to engage roller 151 on bell crank 150 and move trip link 157 slightly toward the right (Fig. 6). As stated aforesaid, shaft 40 is in effect a one-time shaft, i. e. rotating synchronously with shafts 51, and, therefore, cam 152 will always effect link 137 in timed relation with cam 148.

Hand trip mechanism

Link 154 pivoted to trip link 137 is pivoted adjacent its other end to lever 155 secured to shaft 156 mounted in the supporting frames 5a and 5b (Figs. 6 and 7). Exteriorly of frame 5a, shaft 156 carries a lever 157, its forked end engaging pin 158 mounted on rod 159 reciprocatory in bearings 160 on the frame 5a. One end of rod 159 has a collar 161 against which spring 162 engages to hold the rod normally toward the right (Fig. 7).

During operation of the machine, an operator may move rod 159 against spring 162 whereupon trip link 137 will be raised and the machine stopped, in a manner similar to that described aforesaid with respect to the tell-tale lever 145. Normally, however, spring 162 maintains rod 159 ineffective to stop the machine.

If the machine has been stopped, either automatically or manually, as aforesaid, shaft 134 may be actuated against the tension of springs 137 and 125 to move notch 138 of trip link 137 into engagement with latch 139. To this end, there is provided a hand start lever 162a secured to shaft 134 (Fig. 7).

Supplementary hand stop mechanism

Referring to Fig. 1, a lever 163 pivoted to the frame of the wrapping machine W engages trip block 123, which as stated aforesaid is connected through link 120 and clutch lever 117 to the movable clutch element 115. Actuation of lever 163 in a clockwise direction (Fig. 1) effects disengagement of clutch element 115 from pulley v and stops the combined mechanism. If desired, lever 163 may be provided with a ratchet lock device 164 of a well known construction.

Manual gripper releasing device

A shaft 165 mounted in bearings in supporting frames 5a and 5b is provided exteriorly of frame 5a with a hand lever 166 (Figs. 7 and 15). Levers 168 splined to shaft 165 rotatably mounted in bearings 167 on each of the upper members of the chain guides 25a (Figs. 14 and 15) are loosely pinned to bars 169 (Fig. 5). Each bar 169 is mounted for vertical movement above the gripper arms 32 on links 170 pivoted in bearings 171 on the upper members of the chain guides 25a, and is normally biased away from the gripper arms by springs 172.

Should the machine have been stopped, it is necessary to remove any partly dried glued sheets before proceeding further. Under such circumstances, operation of hand operated lever 166 will rotate shaft 165 whereupon bars 169 will engage and open gripper arms 32 against the pressure of springs 31 thereby permitting removal of the undesired sheets.

*The paper supporting belt and associated driving mechanism*

Referring to Fig. 6, shaft 5, which as stated aforesaid rotates step-by-step always in the same direction, carries a sprocket 173, preferably exteriorly of frame 5b, driving sprocket chain 174 engaging sprocket 175 keyed to shaft 176 journalled in the supporting frames 5a and 5b. A gear 177 (Fig. 5) keyed to shaft 176 meshes with a gear 178 keyed to shaft 179 extending parallel with shaft 176 likewise mounted in bearings in the frames 5a and 5b. A pair of rubber rolls 180 and 181 spaced from gears 177 and 178 and mounted respectively on shafts 176 and 179 drive the canvas, rubber or equivalent sheet supporting conveyor belt, band or equivalent 182 passing between said rolls. If desired, the supporting frames 5a and 5b may be slotted at 183 to receive bearings 184 and coiled springs 185, the latter exerting pressure on the bearings and thereby keeping the rolls 180 and 181 with the belt 182 therebetween in "wringing" contact (Fig. 7).

Belt 182 passes over an idler roll 186 disposed in the supporting frames 5a and 5b adjacent the wrapping machine W (Fig. 5) and from thence over an idler roll 187 supported in the arms f (Fig. 2). Supporting structures 182a are disposed beneath the belt to prevent sagging as it travels toward the wrapping machine W (Figs. 1 and 8). If desired, an arrangement for tightening belt 182 may be utilized, and as shown in Fig. 5, comprises a fixed idler roll 188 mounted on shaft 189 in the supporting frames 5a and 5b cooperating with an idler roll 190 supported in arms 191 and held adjustably in engagement with belt 182 by a suitable spring tension device 191a of a character well known in the art.

For bridging the gap between belts d and d1 and conveyor belt 182 a plurality of guiding fingers 192 are provided. If desired, other fingers or strippers 193 may be disposed between adjacent belts d and between belts d and d1 substantially in the plane of said belts (Fig. 2). In some cases, it is desirable that conveyor belt 182 be extended closely adjacent the wrapping machine W, but should this not be done, an arrangement for bridging the gap may be utilized, and as shown in Fig. 5, comprises a plate 193a disposed substantially in the plane of the upper surface of belt 182 and extending transversely of the unit C beneath the conveyor chains.

It is to be understood that the paper conveying belt 182 moves step-by-step in unison with and in the same direction as the sprocket chains carrying the gripper units G1, thereby forming a movable support for the glued sheets.

*Conveyor frame adjusting mechanism*

Oppositely threaded shanks 194 and 194a fixed respectively to supporting frames 5a and 5b engage corresponding oppositely threaded nuts 195 and 195a rotatable in bearings in the conveyor frames 9 (Figs. 3 and 8). Each nut carries a spiral gear 196 meshing respectively with spiral gears 197 keyed to shafts 198 supported in bearings 199 in the frames 9. Any suitable arrangement may be provided for rotating shafts 198 as hand wheels 200 fixed adjacent their ends (Figs. 1, 6, 7 and 8).

The operation is as follows:

Preferably a common base is provided for the three units, the machine W being placed thereon adjacent one end. The unit C is then arranged so that sheets will be fed beneath the form block structure w, positioned so that a vertical plane passed midway between and parallel to the supporting frames 5a and 5b will pass through the vertical longitudinal axis of the rod supporting said form block structure w. The adhesive applying unit G is then so positioned adjacent the other end of the unit C that the vertical plane passed midway between and parallel to the supporting frames 5a and 5b, as aforesaid, will form a continuation of a vertical plane passed midway between and parallel to the outer edges of the belt structure on the unit G. It is also to be undersood that the upper surface of the belt structure on the unit G, the upper surface of the belts 182, and the upper surface of the lower form block or platen w1 when in its upper or box receiving position are substantially in horizontal alignment.

A box of the selected size will now be positioned upon an upper form block structure w of a size corresponding to the box and the form block structure w then will be passed slowly downward through the machine, meanwhile effecting an adjustment of the tools of the machine as well understood in the art and as described in our prior Letters Patent 1,541,036.

Adjustment of the conveyor frames 9 is now effected by rotation of hand wheels 200, the degree of adjustment being such that the free ends of bristles 105a are in vertical alignment with opposite side ends of the form block structure w, whereupon the conveyor frames 9 are locked in position by set screws 9b.

In order to effect an adjustment for the width of the sheets to be utilized, a sheet of the proper width is inserted in normal operating position under the upper form block structure w. The sheet holding plates are then adjusted until the forward edge of the sheet contacts with the vertical edges of slots 25g, whereupon screws 25e are tightened to hold the combined gripper release members and sheet holding plates in the selected position. Drive sprockets 18 are now released by loosening nuts 20 and the two chains 25 are rotated until the arms 32 come into releasing position beneath the cams 25s of the gripper release members 25c. It is to be understood that in effecting this adjustment, chains 25 are so manipulated that the respective gripper units G1 on the chains are maintained parallel to a vertical plane extending at right angles to the longitudinal axis of the conveyor frames 9. Adjustment having been effected, as aforesaid, nuts 20 are tightened thereby binding plugs 19 into engagement with their respective wheels. Thereafter, since units G1 are spaced equidistantly on their respective chains, sheets of the selected size will always be moved under the form block structure w and released at substantially the same point.

A box of the selected size is now placed on the box receiving plates 106 and the upper form block structure w lowered until centrally located therein. Box pusher bars 97 are loosened at the pin and slot connections 97a and the ends of the bars engaged with the edge of the box toward the conveyor unit C whereupon bars 97 are clamped at their respective pin and slot connections. Thereafter, bars 97 will function to move boxes of the selected size always into substantially the same position beneath the upper form block structure w.

The box release pins 63 are now adjusted to correspond to the depth of the selected box by extending the ends thereof slightly into the open box and tightening lock nuts 64. Corresponding adjustment of the stripper rods 65 is also effected at this time, the lower surface thereof being positioned slightly above the upper surface of the box and fixed in position by set screws 66. If the machine is being adjusted to feed boxes differing materially in depth from the type of boxes last used, it may be desirable to effect a rough adjustment of the stripper brush brackets 105 on plates 102 to conform substantially with the height of the selected box.

A stack of sheets corresponding in size to the selected sheet is now placed upon the table of the unit G and the guide members n are adjusted until in engagement with the stack edges and thereafter clamped in position by the set screw t.

After effecting adjustments of the character aforesaid, units G and W are placed in operation, the latter functioning to operate the conveyor unit C. Boxes are intermittently supplied by the box conveying belts 52, the feed thereof being controlled by release pins 63 which alternately rise and fall, thereby releasing individual boxes in timed relation with the wrapping unit W and positioning boxes under the upper form block structure w at the proper time in its cycle of operation. After releasing a box, the release pins 63 drop and prevent passage of a succeeding box until the next corresponding period in the cycle of operation.

The unit G, as stated, is continuously running, the feed of individual sheets, however, being effected at a predetermined period in the cycle of operation of the wrapping machine W and conveying unit C by the cam 40a, bell crank 40b, and associated parts.

When the unit G is tripped as stated above, a sheet is automatcially started and passed through the various rolls to apply a coating of adhesive to one surface thereof. Thereafter the glued sheet is flattened upon the conveyor belts d and d1 by the presser wheels e, and the belts convey the sheet into the waiting pair of grippers G1. Thereupon, the gripper operating members 73 are released and the glued sheet is moved step-by-step toward the wrapping machine W, corresponding glued sheets subsequently being picked up by successive pairs of gripper units G1 in a similar manner.

Upon arrival of a glued sheet under the upper form block structure w, cams 25s on the gripper release members 25c actuate arms 32 of the units G1 to release the glued sheet now temporarily held in position in the suction slot 25g.

Meanwhile a box has been fed under the upper form block structure w, arriving at substantially the same time as does the glued sheet, the box being held above the sheet on the box receiving plates 106. The upper form block structure w now descends, enters the box, disengages the same from the receiving plates 106 and into engagement with the glued sheet whereupon the associated structure engages the lower form block or platen w1 and moves downwardly through the machine to perform the wrapping operation, as is well understood in the art.

The wrapped box in its upward course is stripped from the upper form block structure w by the rows of bristles 105a, whereupon the box falls upon the platen w1 from whence it is ejected by the rods 98.

Referring to our invention as illustrated in Figs. 31 and 35, there is shown an adhesive applying unit G2 and the end of a conveying or transferring unit C1 receiving gummed sheets from the unit G2 and effecting delivery thereof one by one to a wrapping machine (not shown).

As described aforesaid with respect to Fig. 1, the unit G2 may be generally of any suitable type capable of applying adhesive to sheets and is driven at suitable speed by any suitable source of power and operates to move single sheets in succession from the stack $a3$ of unglued sheets through the rotary feed roll mechanism designated generally at $b3$ and into engagement with the gluing roll $c3$ where there is applied, on one side thereof, any suitable adhesive, as glue. The sheets after being stripped and deflected from the glue roll $c3$ are flattened onto conveyor belts $d3$ and $d4$, not by the presser wheels as illustrated and described aforesaid, but by jets of air emitted from vertically extending nozzles $e3$ secured in the frame of the unit $G2$, air being forced under suitable pressure to the pipe $e4$ preferably through a flexible tube $e5$ by a pump (not shown).

It is to be understood that the conveyor mechanism of the unit $G2$, the arrangement for striping and guiding glued sheets therefrom and passing them to the conveying unit $C1$, and the adjustable structure for receiving stacks of sheets of different sizes and centralizing a stack with respect to the conveying mechanism may be and preferably is substantially of the same character as specifically described aforesaid.

Further, it is to be understood that the conveying or transferring unit $C1$ may be and preferably is of the same general character as described aforesaid, although in the present instance an arrangement is provided for applying a fluid such as air, under pressure to the individual glued sheets at about the time of delivery to the said unit $C1$.

Referring to Figs. 31 to 35, sprocket chains $25k$ respectively carry sheet grippers $G3$ corresponding to grippers $G1$ previously described. Gripper operating members $73c$ pivotally mounted in the respective conveyor frames each carry laterally disposed studs $73d$ having openings extending longitudinally of the conveyor belt to receive shanks $73e$ adjustable in the studs $73d$ and held in adjusted position by set screws $73f$. Stop blocks $73g$ secured to shanks $73e$ respectively are provided with tails $73h$ in substantial alignment transversely of the conveyor frames with the vertical portions of gripper palms 29 when open and waiting to receive a sheet, the tails $73h$ and said vertical portions arresting the oncoming glued sheet and cooperating with the gripper palms, upon release of the members $73c$, when both move along the arcs of a circle toward the unit $G2$, to align the sheet transversely of the conveyor mechanism.

Stop block $73g$ is provided with a chamber $73i$ opening into a restricted nozzle-like opening $73j$, air under suitable pressure being applied to chamber $73i$ through a flexible tube $73k$ from a suitable air pump (not shown). When the members $73c$ move upwardly upon being released, jets of air issuing from the nozzles $73j$ serve to strip the glued sheet from tails $73h$ and further serve to hold the sheet against the guiding fingers $192a$ and strippers $193b$.

Pneumatic brake members $73m$ pivotally secured to stop blocks $73g$ by clamps $73n$ are adjustable vertically therein and each comprises a chamber $73o$ opening into an elongated slot $73p$, air being supplied under suitable pressure to the chamber $73o$ through a flexible tube $73q$ from a suitable air pump (not shown).

Air issuing from the pneumatic brake members co-operates with that issuing from the nozzles $73j$ to arrest the oncoming glued sheet and to prevent rebounding of the sheet after engaging the tails $73h$ and the vertical portions of the gripper palms.

Figs. 36 to 39 inclusive illustrate a modified form of our invention, specifically claimed in our co-pending application Serial No. 158,183, filed December 31, 1926, in which suitable blanks, or equivalent, are passed through a bending and forming machine and in the form of non-stayed boxes, or equivalent, are moved individually and in succession into operating position with respect to the form block structure, or equivalent, of a wrapping machine, each non-stayed box arriving substantially coincidentally with a glued sheet delivered by suitable mechanism.

Referring to Fig. 36, $C2$ represents a conveyor unit of any suitable type but preferably substantially as either of the conveyor units described aforesaid with the box conveying structure removed. In lieu of the latter, we utilize structure for feeding, bending and forming suitable blanks, and to this end gears $94e$ splined to shaft $93e$ are rotated alternately in opposite directions and in synchronism with the movement of the upper and lower form block structures $w3$ and $w4$ of the wrapping machine $W2$ by any suitable driving arrangement, as by shaft $93e$ having a gear $93f$ keyed thereto (Fig. 39) meshing with a gear $93g$ keyed to shaft $93h$ carrying a gear $93i$ meshing with a gear (not shown) on the shaft $2e$. It is to be understood that shaft $2e$ is rotated alternately in opposite directions by a gear sector and in timed relation to movements of the form block structure $w3$ or equivalent in a manner as described with respect to Fig. 1. Alternate rotative movement of shaft $2e$ through the train of parts just described is imparted eventually to the gears $94e$ meshing respectively with racks $95e$ slidable in tracks $96e$ mounted respectively in the conveyor frames $9e$. Box pusher bars $97e$ adjustably secured respectively to the rack structures by pin and slot connections $97j$ are moved back and forth in a manner similar to the movement imparted to pusher bars 97 as described aforesaid.

Spiral gear 210 also meshing with spiral gear $93f$ (Fig. 39) is keyed to shaft 211 mounted in bearings in a frame 212 disposed on the frames 5d and 5e. Adjacent its other end shaft 211 carries spiral gear 213 meshing with spiral gear 214 keyed to shaft 215 mounted in bearings in the frame 212. Gears 216 splined to shaft 215 respectively mesh with racks 217 slidable longitudinally of the conveyor unit in track structures 218 disposed on the conveyor frames 9e. A plate 219 adjustably secured to each rack 217 extends inwardly of the conveyor frames and carries a knife edge 220.

In this manner, racks 217 are caused to move backward and forward alternately in unison with racks 95e, and when one set is at its limit of travel in one direction, the other set is similarly at its limit of travel in the same direction. Knives 220 on each movement of racks 217 toward the wrapping machine W2 strip a blank from the stack 221 mounted in hopper plates 222 carried respectively by the track structures 218 and adjustable longitudinally of the conveyor frames 9e by a pin and slot connection 223 (Fig. 37).

Angle form plates 224 respectively mounted for longitudinal adjustment on the track structures 218 by pin and slot connections 225 face cooperating form plates 226, likewise mounted on track structures 218 by pin and slot connections 227 (Figs. 36 and 37), said track structures 218 having downwardly extending members 228 providing bearings for the upper bending roll 229 (Fig. 39). Downwardly extending guide plates 230 likewise carried respectively by said track structures 218 respectively carry guide structures 231 providing bearings for the lower bending roll 232 (Fig. 39). Slidable longitudinally in guide structures 231 are pusher fingers 233 (Figs. 36 and 39) secured to the rack structures 218 by angles 234, and, therefore, moving back and forth with the racks. Guide plates 230 carry guide fingers 235 adjustably mounted thereon by the pin and slot connections 236 (Fig. 36). Track structures 218 carry downwardly and inwardly extending guide fingers 237 adjustably mounted thereon by the pin and slot connections 238 (Fig. 37).

Guide plates 230 are bent inwardly adjacent their bottoms to provide supporting ledges 239 (Figs. 36 and 39).

Plunger operating mechanism

Referring to Fig. 36, shaft y3, corresponding to shaft y of Fig. 1 and constantly rotating, carries spiral gear 240 meshing with spiral gear 241 keyed to shaft 242 mounted in bearings 243 respectively in the frames x3 and 212. Adjacent its other end shaft 242 carries a mitre gear 244 meshing with mitre gear 245 keyed to shaft 246 mounted in bearings in the frame 212.

Referring to Fig. 39, shaft 246 carries cam 247 periodically actuating roller 248 mounted on bell crank 249 pivoted to frame 212 at 250. Link 260 pivoted to bell crank 249 is in turn pivoted to the first step plunger rod 261 guided by a bearing 262 in frame 212, the plunger adjacent its lower end supporting a box advancing member 263. Spiral spring 264 secured to frame 212 and to bell crank 249 tends to keep roller 248 against the cam 247.

Referring to Fig. 36, shaft 246 carries another cam 265 periodically actuating roller 266 mounted on bell crank 267 pivoted to the frame 212 in a manner corresponding to that for bell crank 249. Link 268 pivoted to bell crank 267 is in turn pivoted to the second step plunger rod 269 guided by a bearing 270 in frame 212, the plunger adjacent its lower end supporting a box advancing member 271. A spiral spring corresponding to spring 264 is mounted in a similar manner to retain cam roller 266 against cam 265.

The operation of the modification of our invention illustrated by Figs. 36 to 39 inclusive is as follows:

Preliminarily, it is to be understood that the conveyor frame 9e are adjusted laterally of the supporting frames 5d and 5e to accommodate the desired length of the box to be formed and the conveyor unit wrapper-carrying chains adjusted to bring a sample sheet of the desired width into normal operating position with respect to the form block structure w3 or equivalent, all as described aforesaid with respect to the apparatus illustrated in Fig. 1.

The hopper plates 222 are now adjusted to conform to the size of the selected blank to be utilized, whereupon a stack of such blanks are placed in the hopper plates. Stripper knives 220 are correspondingly adjusted and set against the edge of the blank most removed from the machine W2.

Box advancing members 263 and 271 corresponding in size to the interior of the box to be made are placed respectively upon the first and second step plunger rods 261 and 269.

The respective pairs of plates 224 and 226 are now adjusted beneath a sample blank of the selected size, the plates 224 being set beneath the cutout corners of the blank most removed from the machine W2 and with their respective downwardly extending faces in alignment transversely of the conveyor frames and beneath the transversely scored portion of the blank most removed from the machine W2. Plates 226 are likewise set beneath the cutout corners of the blank nearest the machine W2, with their respective downwardly extending faces in alignment transversely of the conveyor frames and beneath the transversely scored portion of the blank nearest the machine W2.

It is to be understood that in making this adjustment, the pairs of plates 224 and 226, respectively, are positioned at equal distances from a plane passing vertically through the center of box advancing member 263 and the plunger rod 261 and at right angles to the conveyor frames 9e.

The pairs of plates 235 and 237 are adjusted and fixed in position in a similar manner, with each respective pair positioned at equal distances from a plane passing vertically through the center of box advancing member 271 and plunger rod 269 and at right angles to the conveyor frames 9e.

It will be observed that box advancing members 263 and 271 must be changed for any change either in length or width of the blanks but that bending rolls 229 and 232 are changed only when the blanks differ in length.

As described aforesaid, individual glued sheets are passed into normal operating position beneath the form block structure w3 or equivalent, and each sheet, in turn, is released from the gripper units and temporarily held in the suction slots in a manner substantially the same as described with respect to Fig. 1. In timed relation with this movement, knife edges 220 reciprocate with respect to the conveyor frames 9e, and on each stroke toward the wrapping machine select the bottom blank from stack 221 and pass it along the track structures 218 into position above the pairs of plates 224 and 226 and beneath the first step box advancing member 263. At this stage the latter descends and pushes the blank between the respective pairs of form plates 224 and 226 which, with guide members 230, cause partial rupture of the blank at the scored portions, thereby causing the ends and side flaps to assume a substantially vertical position.

In this form, the box is deposited upon the guide structures 231 whereupon, the member 263 rises preparatory to its action on the succeeding blank which is now fed forward by knife edges 220. As the latter again move forward, pusher fingers 233 likewise move forward and bend the rear side flap of the blank toward the wrapping machine W2, the rear corner entering the space beneath said fingers. During continued forward movement, the forward side flap engages stationary form plates 226 under which the now partially formed box is pushed, from whence it passes through the bending rolls 229 and 232, the opposite end flaps of the box extending vertically and passing exteriorly of the rolls adjacent to the guide plates 230. Due to this operation, the tendency of the flaps to return to their original or flattened position is lessened and the finished article will be of improved appearance.

Fingers 233 move the partially completed box along the guide structures 231 into engagement with form plates 235 and 237 where it remains momentarily upon retraction of the guide fingers.

The second stage box advancing member 271 now descends into the blank and forces it downwardly between the pairs of form plates 235 and 237 upon the stationary inwardly extending shelf members 239, and after retraction of the box advancing member 271, racks 95e carrying the box pusher bars 97e are timed to move forward and push the box between the resilient holding plates 106e.

Form block structure w3, or equivalent, is provided with an arrangement (not shown), but of a character substantially as illustrated in Letters Patent 1,065,330, for holding the non-stayed box thereon. Briefly, this arrangement comprises spring holders, outwardly flared at the ends, and secured adjacent their other ends within the outer periphery of the form block structure w3, or equivalent, the springs engaging the opposite end flaps of the box, and releasably securing the entire box to the form block structure w3 or equivalent.

The partially formed box after engaging the glued wrapper moves downwardly through the machine to perform the wrapping operation, as is well understood in the art, and on its upward movement is stripped from the form block structure w3, or equivalent, and ejected in a manner substantially the same as described with respect to Fig. 1.

What we claim is:

1. Box conveying mechanism comprising a travelling belt transporting a series of boxes, a release pin normally engaging the inner face of the rear wall of a box to arrest movement of the series of boxes and movable with respect to said belt at predetermined times to cause resumption of travel of individual boxes with said belt.

2. Box conveying mechanism comprising a travelling belt transporting a series of boxes thereon, release pin adjustable toward and away from said belt normally engaging the inner face of the rear wall of a box to arrest movement of the series of boxes and movable with respect to said belt at predetermined times to cause resumption of travel of individual boxes with said belt.

3. Box conveying mechanism comprising a travelling belt transporting a series of boxes thereon, mechanism normally arresting movement of the series of boxes and operable at predetermined times to cause resumption of travel of individual boxes with said belt, and box stripper mechanism cooperating with said second mentioned mechanism.

4. Box conveying mechanism comprising a travelling belt transporting a series of boxes thereon, mechanism, adjustable for boxes of different dimensions, normally arresting movement of the series of boxes and operable at predetermined times to cause resumption of travel of individual boxes with said belt, and adjustable box stripper mechanism cooperating with said second mentioned mechanism.

5. The combination with a wrapping machine, of apparatus for conveying sheets and box structures into the path of the wrapping machine from block structure comprising means for conveying simultaneously a succession of sheets, means for conveying a succession of box structures, and means responsive to failure of one of said means to effect delivery rendering said other means inoperative.

6. The combination with a wrapping machine of apparatus for conveying sheets and box structures into the path of the wrapping machine form block structure comprising means for conveying simultaneously a succession of sheets, means for conveying a succession of box structures, and means responsive to failure of one of said means to effect delivery rendering both said means inoperative.

7. The combination with a wrapping machine, of apparatus for conveying sheets and box structures into the path of the wrapping machine form block structure comprising means for conveying simultaneously a succession of sheets, means for conveying a succession of box structures, and means responsive to failure of said second named means to effect delivery of a box structure to predetermined position rendering said sheet conveying means inoperative.

8. The combination with a wrapping machine, of apparatus for conveying sheets and box structures into the path of the wrapping machine form block structure comprising means for conveying simultaneously a succession of sheets, means for conveying a succession of box structures, and means responsive to failure of said second named means to effect delivery of a box structure to predetermined position rendering both said means inoperative.

9. Apparatus for simultaneously transporting a series of sheets and delivering them in succession and delivering a series of box structures in succession, consisting of a conveyor unit comprising means for intermittently delivering sheets to a predetermined point, means comprising a continuously moving conveyer for intermittently delivering said box structures to said point in predetermined timed relation to the delivery of the individual sheets to said point, and common supporting structure upon which said conveyors are mounted for movement in the same direction of said sheets and boxes.

10. Apparatus for simultaneously transporting a series of sheets and delivering them in succession and delivering a series of box structures in succession, consisting of a conveyor unit comprising an endless chain having a single direction of movement for intermittently delivering sheets to a predetermined point, means for intermittently delivering said box structures to said point in predetermined timed relation to the delivery of the individual sheets to said point, and common supporting structure upon which said conveyors are mounted for movement in the same direction of said sheets and boxes.

11. Apparatus for delivering a series of sheets in succession and a series of box structures in succession, consisting of a conveyor unit comprising means simultaneously transporting a plurality of sheets and intermittently delivering individual sheets to a predetermined point, means for intermittently delivering said box structures to said point in predetermined timed relation to the delivering of individual sheets to said point, supporting structure upon which said conveyors are so mounted that said sheets and wrappers move in the same direction toward said point, and means for temporarily retaining said sheets and box structures at said point.

12. Apparatus for delivering a series of sheets in succession and a series of box structures in succession, consisting of a conveyor unit comprising means simultaneously transporting a plurality of sheets and intermittently delivering individual sheets to a predetermined point, means comprising a reciprocatory structure for intermittently delivering said box structures to said point in predetermined timed relation to the delivering of individual sheets to said point, supporting structure upon which said conveyors are so mounted that said sheets and wrappers move in the same direction toward said point, and means for temporarily retaining said sheets and box structures at said point.

13. The combination with a box wrapping machine, of a detachable conveyor unit supported on said machine and comprising mechanisms driven by said machine simultaneously to transport a plurality of wrappers and boxes and to deliver individual boxes and wrapper sheets thereto, and structure upon which said transporting mechanisms are so mounted that said wrappers and boxes move in the same direction.

14. The combination with a wrapping machine comprising a main control cam and having form block structure, of a conveyor unit detachably secured to said machine and comprising conveyor mechanisms simultaneously to transport a plurality of wrappers and boxes and to deliver individual boxes and wrapper sheets into the path of said form block structure, means rotating in unison with said cam for operating said conveyor mechanisms, and structure upon which said transporting mechanisms are so mounted that said wrappers and boxes move in the same direction.

15. A conveyor unit comprising means for conveying sheets in succession, means for conveying box structures in succession, and means common to said conveying means for effecting simultaneous adjustment thereof, whereby box structures and sheets of different dimensions may be conveyed.

16. A conveyor unit comprising belts for conveying boxes in succession, and means for adjusting a belt transversely of the direction of movement of said belts.

17. In apparatus of the character described, means for conveying boxes in succession, release mechanism for said boxes, a support for said release structure and said box-conveying means, and means for adjusting said support transversely of the direction of movement of said first mentioned means.

18. In apparatus of the character described, means for conveying box structures in succession, means for applying individual sheets to individual boxes, mechanism for stripping individual boxes from said last mentioned means, a support for said mechanism and said box conveying means, and means for adjusting said support transversely of the direction of movement of said first mentioned means.

19. In apparatus of the character described, means for conveying box structures in succession, box structure receiving and holding mechanism for receiving individual boxes, a support for said mechanism and said box conveying means, and means for adjusting said support transversely of the direction of movement of said first mentioned means.

20. In apparatus of the character described, means for conveying box structures in succession to a predetermined region, reciprocatory means for advancing individual box structures from said region, a support for said last mentioned means, and means for adjusting said support transversely of the direction of movement of said first mentioned means.

21. The combination with a wrapping machine, of box-conveying mechanism comprising a travelling belt transporting a series of boxes thereon, mechanism normally arresting movement of the series of boxes and operable at predetermined times in timed relation with the wrapping machine to cause resumption of travel of individual boxes with said belt, and box-stripper mechanism co-operating with said second mentioned mechanism.

22. In a system for applying wrappers to boxes, the combination with a wrapping machine and a machine spaced therefrom comprising mechanism for removing from a stack and applying adhesive to wrappers in succession, of a conveyer bridging the span between said machines and comprising means for transporting the wrappers from said second named machine to said wrapping machine and means for transporting boxes to said wrapping machine in the same direction as the wrappers.

23. In a system for applying wrappers to boxes, the combination with a wrapping machine and a machine spaced therefrom comprising mechanism for removing from a stack and applying adhesive to wrappers in succession, of a conveyer bridging the span between said machines and comprising means for transporting the wrappers from said second named machine to said wrapping machine and an endless belt for transporting boxes in succession towards said wrapping machine in the same direction as the wrappers.

24. In a system for applying wrappers to boxes, the combination with a wrapping machine and a machine spaced therefrom comprising mechanism for removing from a stack and applying adhesive to wrappers in succession, of a conveyer bridging the span between said machines and comprising means for transporting the wrappers from said second named machine to said wrapping machine and a reciprocatory structure for transporting boxes to said wrapping machine in the same direction as the wrappers.

25. In a system for applying wrappers to boxes, the combination with a wrapping machine and a machine spaced therefrom comprising mechanism for removing from a stack and applying adhesive to wrappers in succession, of a conveyer bridging the span between said machines and comprising means for transporting the wrappers from said second named machine to said wrapping machine and an endless belt for transporting boxes in succession towards said wrapping machine, and mechanism normally arresting movement of the series of boxes while movement of said belt continues and operable at predetermined times to cause resumption of travel of individual boxes with said belt in the same direction as the wrappers.

26. Box conveying mechanism comprising a travelling belt transporting a series of boxes, a member adapted to engage a wall of a box interiorly thereof to arrest movement of the series of boxes while movement of said belt continues, and operable at predetermined times to cause resumption of travel of individual boxes with said belt.

27. The combination with a wrapping machine, of box conveying mechanism transporting a series of boxes, mechanism normally arresting movement of the series of boxes and operable at predetermined times to cause resumption of travel of individual boxes, box stripper mechanism co-operating with said second mentioned mechanism, and means co-operating with said stripper mechanism normally to permit operation of said machine and said conveying mechanism, and effective upon absence of a box in engagement with said stripper mechanism to stop said machine and said conveying mechanism.

28. In apparatus of the character described, means for conveying box structures in succession to a predetermined region, release mechanism for said boxes, reciprocating means for advancing individual box structures from said region, a support for said conveying means, release mechanism and reciprocatory means, and means for adjusting said support transversely of the direction of movement of said first mentioned means.

29. In a system for applying wrappers to boxes, the combination with a wrapping machine having form block structure, of mechanism controlled by and operating in timed relation therewith to feed a series of wrappers in succession from a stack to adhesive coating apparatus, and a conveyor bridging the span between said wrapping machine and said sheet feeding mechanism and comprising means intermittently operating in timed relation to said wrapping machine simultaneously to transport a plurality of wrappers and deliver them in succession into the path of said form block and means for transporting boxes and delivering them in succession into the path of said form block.

30. Box conveying mechanism comprising a continuously moving belt transporting a series of boxes, and stop structure, adjustable toward and away from said belt, adapted to engage a wall of a box interiorly thereof to arrest movement of the series of boxes while movement of the belt continues, and operable at predetermined times to cause resumption of travel of individual boxes with said belt.

31. The combination with box conveyor mechanism comprising a travelling belt transporting a series of boxes thereon in a direction toward a predetermined region, and stop structure normally engaging the interior of the first box of said series to arrest movement of said series and operable at predetermined times to cause resumption of travel of individual boxes with said belt, of box conveyor mechanism comprising structure reciprocatory in timed relation to said stop structure to advance said individual boxes in the same direction toward said predetermined region.

32. The combination with a wrapping machine having reciprocatory form block structure, of a travelling belt transporting a series of boxes toward said form block structure in the plane of the path of movement thereof, structure normally arresting movement of said series of boxes, and means timed with said form block structure to cause resumption of travel of individual boxes with said belt, and means movable in said plane for effecting further movement of said individual boxes in the same direction into the path of movement of said form block.

33. In a system for applying wrappers to boxes, the combination with a wrapping machine having form block structure, conveyor mechanism transporting a series of wrappers step by step toward and delivering individual wrappers to said form block structure, a box conveying mechanism comprising a continuously moving belt transporting a series of boxes and delivering individual boxes to said form block structure in timed relation to the delivery of individual wrappers thereto.

34. In a box-wrapping machine, box feeding means comprising reciprocatory structure, means for adjusting said structure to accommodate unwrapped boxes of different dimensions, structure for ejecting wrapped boxes movable with said first structure, and means for adjusting said second structure with respect to said first structure to accommodate wrapped boxes of different dimensions.

35. In a box-wrapping machine having form block structure reciprocatory along a definite path, mechanism for receiving and holding a box in said path, mechanism for stripping boxes from said form block structure, means for conveying boxes, and means for simultaneously actuating said first mechanism to receive a box delivered by said box-conveyor means and hold it in said path and to move said stripping mechanism from said path.

36. In apparatus of the character described, means for conveying box structures in succession, means for applying individual sheets to individual boxes, structure receiving individual boxes from said conveying means and holding them, structure for stripping boxes from said sheet applying means, a support for said box-conveyor means and said structures, and means for adjusting said support transversely of the direction of movement of said conveyor means.

37. The combination with wrapping machine form block structure reciprocatory along a definite path, of a plate pivoted adjacent said path, box structure receiving and holding mechanism and box structure stripper mechanism carried by said plate, means timed with said form block structure for rocking said plate, means timed with said form block structure for feeding a box structure to said first named mechanism, a support for said plate and said box feeding means, and means for adjusting said support transversely of the direction of movement of said box conveying means.

38. Apparatus for continuously delivering groups each comprising a coated sheet and box structure to a predetermined point comprising a conveyor simultaneously transporting a series of coated sheets and delivering them to said predetermined point in succession, a conveyor for simultaneously transporting a series of box structures and delivering them in succession to said predetermined point, and means for operating said conveyors in timed relation intermittently to effect substantially simultaneous delivery at said point of a coated sheet and box structure.

39. The combination with a wrapping machine having movable form block structure, of conveyor frames extending toward the path of movement of said structure on opposite sides thereof, conveyor mechanism supported by said frames for transporting boxes into the path of movement of said structure, and means for adjusting said frames in opposite directions with respect to said form block structure and in substantial alignment with opposite sides thereof to accommodate boxes of different dimensions and to ensure delivery in register with said form block structure.

40. The combination with a wrapping machine having movable form block structure, of conveyor frames extending toward the path of movement of said structure on opposite sides thereof, an endless conveyor structure supported by said frames for simultaneously transporting a plurality of boxes toward said path, reciprocating structure supported by said frames receiving individual boxes from said endless conveyor structure and delivering them in the path of movement of said form block structure, and means for adjusting said frames in opposite directions in substantial alignment with opposite sides of said form block structure simultaneously to effect adjustment of said endless conveyor and reciprocating structures to accommodate boxes of different dimensions and to ensure delivery in register with said form block structure.

41. The combination with a wrapping machine having movable form block structure, of conveyor frames extending from the path of movement of said structure on opposite sides thereof, conveyor mechanism supported by said frames simultaneously transporting a plurality of coated sheets, a second conveyor mechanism supported by said frames for simultaneously transporting a plurality of boxes toward said path of movement in the same direction as and over said wrappers, means operating in timed relation to said form block structure controlling said conveyors to effect delivery of a box and wrapper in said path in registering relation, and means for adjusting said frames in opposite directions with respect to said form block structure and in substantial alignment with opposite sides thereof simultaneously to adjust said conveyors for boxes and wrappers of different dimensions and to ensure their delivery in proper register with each other and said form block structure.

42. A full automatic box wrapping system comprising wrapping machine form block structure, means operating in timed relation to said form block structure for removing sheets from a stack and coating them in succession with adhesive, a conveyor operating in timed relation to said form block structure simultaneously to transport a plurality of coated sheets and deliver them in succession to said form block structure, and a conveyor operating in timed relation to said form block structure for simultaneously transporting a plurality of boxes and delivering them in succession to said form block structure in timed relation to delivery of coated sheets thereto.

THEODORE A. FEDERWITZ.
WALTER T. BAILEY.